(12) United States Patent
Hauck et al.

(10) Patent No.: US 6,842,805 B1
(45) Date of Patent: *Jan. 11, 2005

(54) METHOD AND APPARATUS FOR PREVENTING LOOPS IN A FULL-DUPLEX BUS

(75) Inventors: Jerrold V. Hauck, Fremont, CA (US); Colin Whitby-Strevens, Bristol (GB)

(73) Assignee: Apple Computer, Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/390,944

(22) Filed: Mar. 17, 2003

Related U.S. Application Data

(63) Continuation of application No. 09/435,160, filed on Nov. 5, 1999, now Pat. No. 6,587,904.

(51) Int. Cl.[7] .......................... G06F 15/16; H04L 12/28
(52) U.S. Cl. ........................ 710/104; 709/221; 370/256
(58) Field of Search ................................ 709/220–222, 709/224, 232, 235, 238, 243; 710/100, 300–302, 104, 107, 305–306; 370/216–222, 241–242, 254–256

(56) References Cited

U.S. PATENT DOCUMENTS

| | | | |
|---|---|---|---|
| 4,156,798 A | 5/1979 | Doelz | 179/15 AL |
| 4,194,113 A | 3/1980 | Fulks et al. | 371/20 |
| 5,014,262 A | 5/1991 | Harshavardhar | 370/16 |
| 5,274,631 A | 12/1993 | Bhardwaj | 370/60 |
| 5,321,812 A * | 6/1994 | Benedict et al. | 709/223 |
| 5,343,461 A | 8/1994 | Barton et al. | 370/13 |
| 5,394,556 A | 2/1995 | Oprescu | 395/800 |
| 5,406,643 A | 4/1995 | Burke et al. | 395/200 |
| 5,452,330 A | 9/1995 | Goldstein | 375/257 |
| 5,490,253 A | 2/1996 | Laha et al. | 395/304 |

(List continued on next page.)

OTHER PUBLICATIONS

"IEEE Standard for a High Performance Serial Bus", IEEE Standard 1394–1995, Institute of Electrical and Electronics Engineers, Inc., Aug. 30, 1996.
P1394b IEEE Draft Standard for a High Performance Serial Bus (High Speed Supplement), Institute of Electrical and Electronics Engineers, Inc., pp. 1–408, 2002 (no month).
"AV/C Digital Interface Command Set General Specification, Rev. 3.0", 1394 Trade Association, pp. 4–5, 20–34, Apr. 15, 1998.
"Enhancements to the AV/C General Specification 3.0 Version 1.0FC1", 1394 Trade Association, pp. 4, 6–17, Nov. 5, 1998.
"Fibre Channel–Methodologies for Jitter Specification", NCITS TR–25–1999, Jitter Working Group Technical Report, Rev. 10, pp. 1–96, Jun. 9, 1999.

*Primary Examiner*—Paul R. Myers
(74) *Attorney, Agent, or Firm*—Sierra Patent Group, Ltd.

(57) ABSTRACT

A method and apparatus is disclosed for preventing loops in a full-duplex bus. One method has the acts of: selecting at least two candidates to join said bus; establishing a dominant candidate from one of said at least two candidates; testing for loops in said bus; and joining said dominant candidate if no loops are found in said bus.

Another method has the acts of: selecting a plurality candidates to join said bus; establishing at least one dominant candidate; testing for loops in said bus; and joining said at least one dominant candidate if no loops are found in said bus. Alternative embodiments are shown that utilize unique identifiers to facilitate candidate selection and to establish dominance on the bus.

13 Claims, 22 Drawing Sheets

U.S. PATENT DOCUMENTS

| | | | |
|---|---|---|---|
| 5,495,481 A | 2/1996 | Duckwall | 370/85.2 |
| 5,524,254 A | 6/1996 | Morgan et al. | 395/800 |
| 5,539,390 A | 7/1996 | Nagano et al. | 340/825.07 |
| 5,541,670 A | 7/1996 | Hanai | 348/705 |
| 5,568,641 A | 10/1996 | Nelson et al. | 395/700 |
| 5,583,922 A | 12/1996 | Davis et al. | 379/96 |
| 5,621,659 A | 4/1997 | Matsumoto et al. | 364/514 R |
| 5,630,173 A | 5/1997 | Oprescu | 395/860 |
| 5,632,016 A | 5/1997 | Hoch et al. | 395/200.02 |
| 5,640,595 A | 6/1997 | Baugher et al. | 395/830 |
| 5,642,515 A | 6/1997 | Jones et al. | 395/727 |
| 5,654,657 A | 8/1997 | Pearce | 327/163 |
| 5,684,715 A | 11/1997 | Palmer | 365/514 |
| 5,701,476 A | 12/1997 | Fenger | 395/652 |
| 5,701,492 A | 12/1997 | Wadsworth et al. | 395/712 |
| 5,706,278 A | 1/1998 | Robillard et al. | 370/222 |
| 5,712,834 A | 1/1998 | Nagano et al. | 369/19 |
| 5,719,862 A | 2/1998 | Lee et al. | 370/355 |
| 5,754,765 A | 5/1998 | Danneels et al. | 395/200.1 |
| 5,784,648 A | 7/1998 | Duckwall | 395/860 |
| 5,802,048 A | 9/1998 | Duckwall | 370/389 |
| 5,802,057 A | 9/1998 | Duckwall et al. | 370/408 |
| 5,802,365 A | 9/1998 | Kathail et al. | 395/681 |
| 5,805,073 A | 9/1998 | Nagano et al. | 340/825.07 |
| 5,809,331 A | 9/1998 | Staats et al. | 395/830 |
| 5,826,027 A | 10/1998 | Pedersen et al. | 395/200.51 |
| 5,832,298 A | 11/1998 | Sanchez et al. | 395/828 |
| 5,835,761 A | 11/1998 | Ishii et al. | 395/653 |
| 5,845,152 A | 12/1998 | Anderson et al. | 395/872 |
| 5,867,730 A | 2/1999 | Leyda | 395/830 |
| 5,875,301 A | 2/1999 | Duckwall et al. | 395/200.51 |
| 5,923,663 A | 7/1999 | Bontemps et al. | 370/445 |
| 5,930,480 A | 7/1999 | Staats | 395/200.74 |
| 5,935,208 A | 8/1999 | Duckwall et al. | 709/221 |
| 5,938,764 A | 8/1999 | Klein | 713/1 |
| 5,940,600 A | 8/1999 | Staats et al. | 395/287 |
| 5,968,152 A | 10/1999 | Staats | 710/104 |
| 5,970,052 A | 10/1999 | Lo et al. | 370/241 |
| 5,987,605 A | 11/1999 | Hill et al. | 713/2 |
| 5,991,842 A | 11/1999 | Takayama | 710/105 |
| 6,032,202 A | 2/2000 | Lea et al. | 710/8 |
| 6,032,261 A | 2/2000 | Hulyalkar | 713/400 |
| 6,038,234 A | 3/2000 | LaFollette et al. | 370/443 |
| 6,038,625 A | 3/2000 | Ogino et al. | 710/104 |
| 6,070,187 A | 5/2000 | Subramaniam et al. | 709/220 |
| 6,073,206 A | 6/2000 | Piwonka et al. | 711/102 |
| 6,091,726 A | 7/2000 | Crivellari et al. | 370/392 |
| 6,115,764 A | 9/2000 | Chisholm et al. | 710/100 |
| 6,131,129 A | 10/2000 | Ludtke | 710/5 |
| 6,131,134 A | 10/2000 | Huang et al. | 710/103 |
| 6,133,938 A | 10/2000 | James | 348/8 |
| 6,138,196 A | 10/2000 | Takayama et al. | 710/105 |
| 6,141,702 A | 10/2000 | Ludtke et al. | 710/5 |
| 6,141,767 A | 10/2000 | Hu et al. | 714/1 |
| 6,145,018 A | 11/2000 | LaFollette et al. | 710/8 |
| 6,157,972 A | 12/2000 | Newman et al. | 710/100 |
| 6,160,796 A | 12/2000 | Zou | 370/257 |
| 6,167,532 A | 12/2000 | Wisecup | 714/23 |
| 6,173,327 B1 | 1/2001 | De Borst et al. | 709/231 |
| 6,192,189 B1 | 2/2001 | Fujinami et al. | 386/96 |
| 6,199,119 B1 | 3/2001 | Duckwall et al. | 710/8 |
| 6,202,210 B1 | 3/2001 | Ludtke | 725/20 |
| 6,212,171 B1 | 4/2001 | LaFollette et al. | 370/257 |
| 6,212,633 B1 | 4/2001 | Levy et al. | 713/153 |
| 6,219,697 B1 | 4/2001 | Lawande et al. | 709/221 |
| 6,233,615 B1 | 5/2001 | Van Loo | 709/224 |
| 6,233,624 B1 | 5/2001 | Hyder et al. | 709/327 |
| 6,243,778 B1 | 6/2001 | Fung et al. | 710/113 |
| 6,247,063 B1 | 6/2001 | Ichimi et al. | 709/250 |
| 6,247,083 B1 | 6/2001 | Hake et al. | 710/107 |
| 6,253,114 B1 | 6/2001 | Takihara | 700/83 |
| 6,253,255 B1 | 6/2001 | Hyder et al. | 709/321 |
| 6,260,063 B1 | 7/2001 | Ludtke et al. | 709/224 |
| 6,266,334 B1 | 7/2001 | Duckwall | 370/397 |
| 6,266,701 B1 | 7/2001 | Sridhar et al. | 709/232 |
| 6,275,889 B1 | 8/2001 | Saito | 710/129 |
| 6,282,597 B1 | 8/2001 | Kawamura | 710/105 |
| 6,292,840 B1 | 9/2001 | Blomfield-Brown et al. | 709/247 |
| 6,295,479 B1 | 9/2001 | Shima et al. | 700/83 |
| 6,308,222 B1 | 10/2001 | Krueger et al. | 709/247 |
| 6,311,228 B1 | 10/2001 | Ray | 709/301 |
| 6,314,461 B2 | 11/2001 | Duckwall et al. | 709/221 |
| 6,343,321 B2 | 1/2002 | Patki et al. | 709/227 |
| 6,345,315 B1 | 2/2002 | Mishra | 709/329 |
| 6,347,362 B1 | 2/2002 | Schoinas et al. | 711/147 |
| 6,353,868 B1 | 3/2002 | Takayama et al. | 710/129 |
| 6,356,558 B1 | 3/2002 | Hauck et al. | 370/450 |
| 6,363,085 B1 | 3/2002 | Samuels | 370/502 |
| 6,385,679 B1 | 5/2002 | Duckwall et al. | 710/119 |
| 6,405,247 B1 | 6/2002 | Lawande et al. | 709/221 |
| 6,411,628 B1 | 6/2002 | Hauck et al. | 370/447 |
| 6,418,150 B1 | 7/2002 | Staats | 370/503 |
| 6,425,019 B1 | 7/2002 | Tateyama et al. | 710/11 |
| 6,426,062 B1 | 7/2002 | Chopra et al. | 424/65 |
| 6,442,630 B1 | 8/2002 | Takayama et al. | 710/105 |
| 6,446,142 B1 | 9/2002 | Shima et al. | 710/16 |
| 6,452,975 B1 | 9/2002 | Hannah | 375/257 |
| 6,457,086 B1 | 9/2002 | Duckwall | 710/305 |
| 6,466,982 B1 | 10/2002 | Ruberg | 709/227 |
| 6,496,862 B1 | 12/2002 | Akatsu et al. | 709/224 |
| 6,513,085 B1 | 1/2003 | Gugel et al. | 710/305 |
| 6,519,657 B1 | 2/2003 | Stone et al. | 710/10 |
| 6,529,522 B1 | 3/2003 | Ito et al. | 370/466 |
| 6,587,904 B1 | 7/2003 | Hauck et al. | 710/107 |
| 6,591,300 B1 | 7/2003 | Yurkovic | 709/226 |
| 2001/0001151 A1 | 5/2001 | Duckwall et al. | 710/8 |
| 2001/0019561 A1 | 9/2001 | Staats | 370/487 |
| 2001/0024423 A1 | 9/2001 | Duckwall et al. | 370/254 |
| 2002/0057655 A1 | 5/2002 | Staats | 370/256 |
| 2002/0085581 A1 | 7/2002 | Hauck et al. | 370/442 |
| 2002/0101231 A1 | 8/2002 | Staats | 324/126 |
| 2002/0103947 A1 | 8/2002 | Duckwall et al. | 710/19 |
| 2002/0188780 A1 | 12/2002 | Duckwall | 710/105 |
| 2002/0188783 A1 | 12/2002 | Duckwall et al. | 710/244 |
| 2003/0037161 A1 | 2/2003 | Duckwall et al. | 709/233 |
| 2003/0055999 A1 | 3/2003 | Duckwall et al. | 709/236 |

* cited by examiner

METHOD AND APPARATUS FOR PREVENTING LOOPS IN A FULL-DUPLEX BUS

This application is a continuation of U.S. patent application Ser. No. 09/435,160, filed Nov. 5, 1999, now U.S. Pat. No. 6,587,904.

BACKGROUND OF THE INVENTION

1. Field of the Invention

The present invention relates to serial bus management. In particular, the present invention relates to a method and apparatus for preventing loops in a serial bus system.

2. The Prior Art

Modern electronic equipment has greatly enhanced the quality of our lives. However, as the use of such equipment has increased, so has the need to connect equipment purchased from different manufacturers. For example, while a computer and a digital camera may each be useful when used alone, the ability to connect the digital camera to the computer and exchange information between the two makes the combination even more useful. Therefore, a need was apparent for a serial bus standard that would allow for the connection and communication between such devices.

The IEEE 1394-1995 standard was developed to satisfy this need. This standard, revolutionized the consumer electronics industry by providing a serial bus management system that featured high speeds and the ability to "hot" connect equipment to the bus; that is, the ability to connect equipment without first turning off the existing connected equipment. Since its adoption, the IEEE 1394-1995 standard has begun to see acceptance in the marketplace with many major electronics and computer manufacturers providing IEEE 1394-1995 connections on equipment that they sell.

However, as technologies improved, the need to update the IEEE 1394-1995 standard became apparent. Improvements such as higher speeds and longer connection paths are needed. There is currently an improved standard in development, herein referred to as the P1394b, which will provide such improvements.

One problem that is associated with serial bus systems is that of loops occurring in a system. In order for a serial bus system to function properly, one end of the bus cannot be connected to the other. Loops typically occur when an end user, typically a consumer, inadvertently connects a new device to the bus in such a manner that a loop is formed. If this occurs, a "loop" is formed in the system, and the system will fail to properly initialize. Once a loop is formed, the system will not function properly, since communications between devices is impossible.

Consequentially, there is a need for an method for managing a serial bus system that detects when a loop has been formed, and eliminates the loop.

Furthermore, since there will be equipment utilizing both the α and β standards on the market, there is a need for a serial bus loop-breaking system that is compatible with the β standard, and is backwards-compatible with the α standard.

Finally there is a need for a system that prevents the above problems by building a loop-free connection from the start.

BRIEF DESCRIPTION OF THE INVENTION

The invention satisfies the above needs. The present invention relates to a method and apparatus for preventing loops in a full-duplex bus. A preferred method for preventing loops in a full-duplex bus has the following acts: selecting at least two candidates to join the bus; establishing a dominant candidate from one of the at least two candidates; testing for loops in the bus; and joining the dominant candidate if no loops are found in the bus.

Another preferred method for preventing loops in a full-duplex bus has the following acts: selecting a plurality candidates to join the bus: establishing at least one dominant candidate; testing for loops in the bus; and joining the at least one dominant candidate if no loops are found in the bus.

Another preferred method for breaking loops in a bus containing both full-duplex and uniplex devices is disclosed, the method comprising the acts of: determining whether the loop comprises only full-duplex devices and breaking the loop at any point on the bus; determining whether the loop comprises only uniplex devices and quarantining the loops comprising uniplex devices from the bus; and determining whether the loop comprises both uniplex and full-duplex devices, and breaking the loop by utilizing only full-duplex device to break the loop.

An electronic device adapted to communicate on a full-duplex bus is disclosed, the device comprising: means for selecting two candidates to join the bus; means for establishing a dominant candidate; means for testing for loops in the bus; and means for joining the dominant candidate if no loops are found in the bus.

An electronic device adapted to communicate on a full-duplex bus is disclosed, the device comprising: means for selecting a plurality candidates to join the bus; means for establishing at least one dominant candidate; means for testing for loops in the bus; and means for joining the at least one dominant candidate if no loops are found in the bus.

A method for detecting and breaking loops in a full-duplex electronic bus is disclosed, the method comprising the acts of: selecting candidates to join to the bus; arbitrating for control of the bus; transmitting a loop test packet containing a unique identifier on the bus; receiving loop test packets from the bus, the received loop test packets containing a unique identifier; surrendering control of the bus if any the unique identifier contained in any the received loop test packet is greater than the unique identifier contained in the transmitted loop test packet and waiting for the bus to return to idle before attempting to join the bus again; and joining the selected candidates to the bus if any the unique identifier contained in the transmitted loop test packet is greater than or equal to any the unique identifier contained in the received loop test packet.

A method for detecting and breaking loops in a full-duplex electronic bus, the method comprising the acts of: connecting a device to the bus; testing for a loop in the bus; quarantining the device from the bus a loop is found; resuming the device if no loop is found; testing for a loop in the bus if the device does not resume within a predetermined time period; activating the device; and testing for a loop in the bus if the device does not activate within the predetermined time period.

Finally, a program storage device readable by a machine, tangibly embodying a program of instructions executable by a machine to prevent loops on a full-duplex bus, is disclosed, the device comprising: means for selecting a plurality candidates to join the bus; means for establishing at least one dominant candidate; means for testing for loops in the bus; and means for joining the at least one dominant candidate if no loops are found in the bus.

BRIEF DESCRIPTION OF THE DRAWING FIGURES

DETAILED DESCRIPTION OF PREFERRED EMBODIMENTS

Figure 1B:
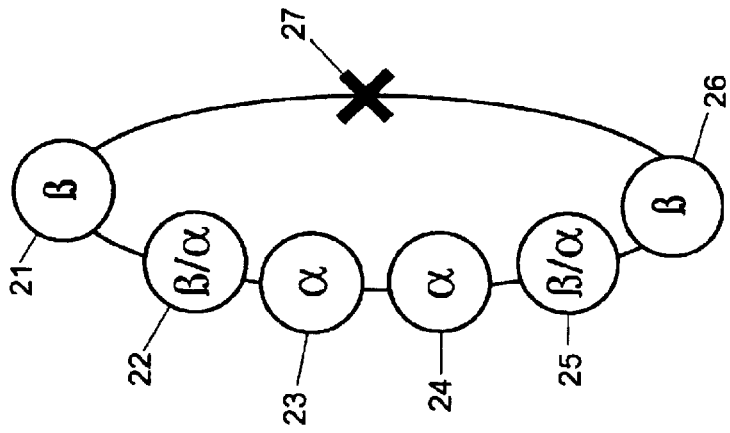
FIG. 1B is a block diagram of a hybrid loop.

Persons of ordinary skill in the art will realize that the following description of the present invention is illustrative only and not in any way limiting. Other embodiments of the invention will readily suggest themselves to such skilled persons having the benefit of this disclosure.

The present invention relates to data communications. More particularly, the present invention relates to a method and apparatus for breaking loops on a serial bus using the P1394b standard. The invention further relates to machine readable media on which are stored embodiments of the present invention. It is contemplated that any media suitable for retrieving instructions is within the scope of the present invention. By way of example, such media may take the form of magnetic, optical, or semiconductor media.

The invention further relates to devices that embody the IEEE-1394b standard. By way of example, such devices may include those typically used in an audio/video entertainment system, such as home theater receivers, DVD players, computers, or hand-held devices such as cameras and the like. The devices may also include those industrial in nature, such as test and measurement equipment, professional audio/video recording devices, as well as system control or robotic devices found in an industrial environment.

The invention also relates to nodes and physical computers, such as state machines. The present invention may be embodied in any collection of nodes linked together through a bus. Typically, each device connected to the bus will also have one corresponding node physical layer controller embedded therein. However, a given device may have more than one node, and therefore it follows that one device may have more than one connection to more than one bus. For the discussion that follows, the examples will show the typical situation where one node corresponds to one device.

Each node may communicate to other nodes in a P1394b compatible system though links. Typically, a cable is used for a link, as is provided for in the IEEE-P1394b standard. However, any communication means may be employed. By way of example, an infrared, RF, or other wireless system may be used, as well as an optical system.

Typically, a link is coupled to a node through a port. A port transmits and receives messages and data between the node and link. As is known by those of ordinary skill in the art, each node may have more than one port.

In the discussion that follows, much of the lower-level detail such as ports and links will be omitted, and the discussion will focus instead on nodes. Furthermore, the discussion will focus on nodes connected to a serial bus compatible with the IEEE 1394-1995 standard. In accordance with the IEEE 1394-1995 standard, a physical node is referred to as a PHY. Therefore, in the discussion that follows PHYs that are compatible with either the IEEE 1394-1995 or the P1394a standards will be referred to as a PHYs, and PHYs compatible with the P1394b standard will be referred to as $\beta$ PHYs. Finally, $\beta$ nodes that must communicate with both $\alpha$ and $\beta$ devices are referred to herein as "border" nodes.

Since the present invention requires that two nodes communicate, it is directed towards the IEEE-P1394b standard, and the advantages contained therein. However, any high-performance bus standard could be used for the present invention. For example, any standard that allows for full-duplex communication between nodes may be used.

As the IEEE-P1394b standard enters the market, it is contemplated that end users may encounter at least three potential loop scenarios: 1) a loop may be formed by all $\beta$ PHYs; 2) a loop may be formed by all a PHYs; or 3) a loop may be formed by a combination of $\alpha$ and $\beta$ PHYs. Each scenario will now be examined in turn.

Figure 1C:
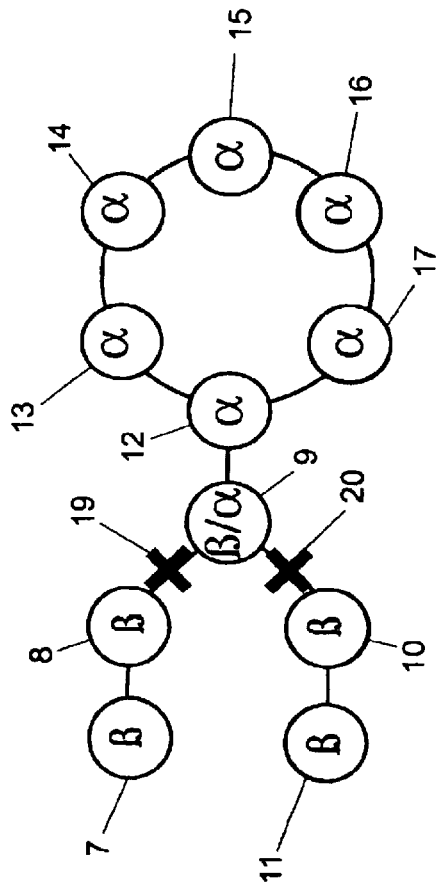
FIG. 1C is a block diagram of a pruned loop.
Figure 1A:
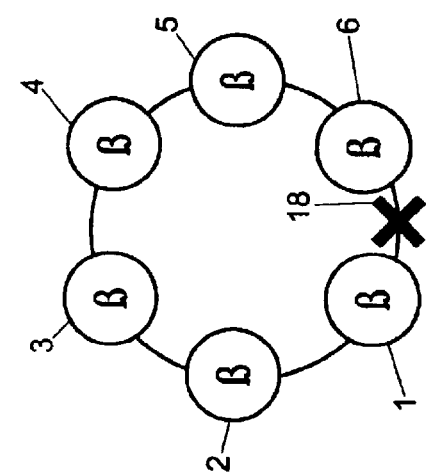
FIG. 1A is a block diagram of a pure beta loop.

Referring first to FIG. 1A, a system containing only $\beta$ PHYs is shown. Each $\beta$ device 1–6 represents a physical node compatible with the IEEE-P1394b standard, or a $\beta$ PHY, as discussed above. FIG. 1A shows $\beta$ PHYs 1–6 forming a loop which must be broken.

In a preferred embodiment of the present invention, when a loop is formed solely by $\beta$ PHYs, the loop may be broken anywhere in the loop. The method and apparatus for breaking such loops will be discussed in more detail later. FIG. 1A shows the loop broken at location 18, between nodes 1 and 6. However, because the loop in FIG. 1A is made up of only β PHYs, the loop may be broken anywhere in the loop by a pair of β PHYs.

FIG. 1B shows a system containing both α and β PHYs. In a preferred embodiment of the present invention, when a loop contains both α and β PHYs, the loop-breaking algorithm will be optimized to insure that the loop will be broken between two β devices. Therefore, when breaking loops containing both α and β PHYs, operation of α PHYs will not be effected.

FIG. 1B shows β PHYs 21 and 26, α/β border nodes 22 and 25, and α PHYs 23 and 24. Since it is preferable in accordance with the present invention to break loops between two β PHYs, the present invention could break loop at location 27, between β PHYs 21 and 26, thus leaving the α PHYs unaffected.

FIG. 1C shows a situation where an a loop must be completely pruned from the bus. In FIG. 1C, β PHYs 7, 8, 10, and 11 are joined through hybrid PHY 9 to a loop completely formed by α PHYs 12, 13, 14, 15, 16 and 17. As is known by those of ordinary skill in the art, the loop formed by the α devices will render the bus inoperable. Because a PHYs cannot break loops themselves, the present invention will instead break the loop near β PHYs 8 and 10 by severing the loop at locations 19 and 20, respectively. This effectively "prunes" the α PHY loop from the bus, and recovers operation of the bus by creating two separate operational buses consisting of β devices 7 and 8, and β devices 10 and 11.

Figure 2:
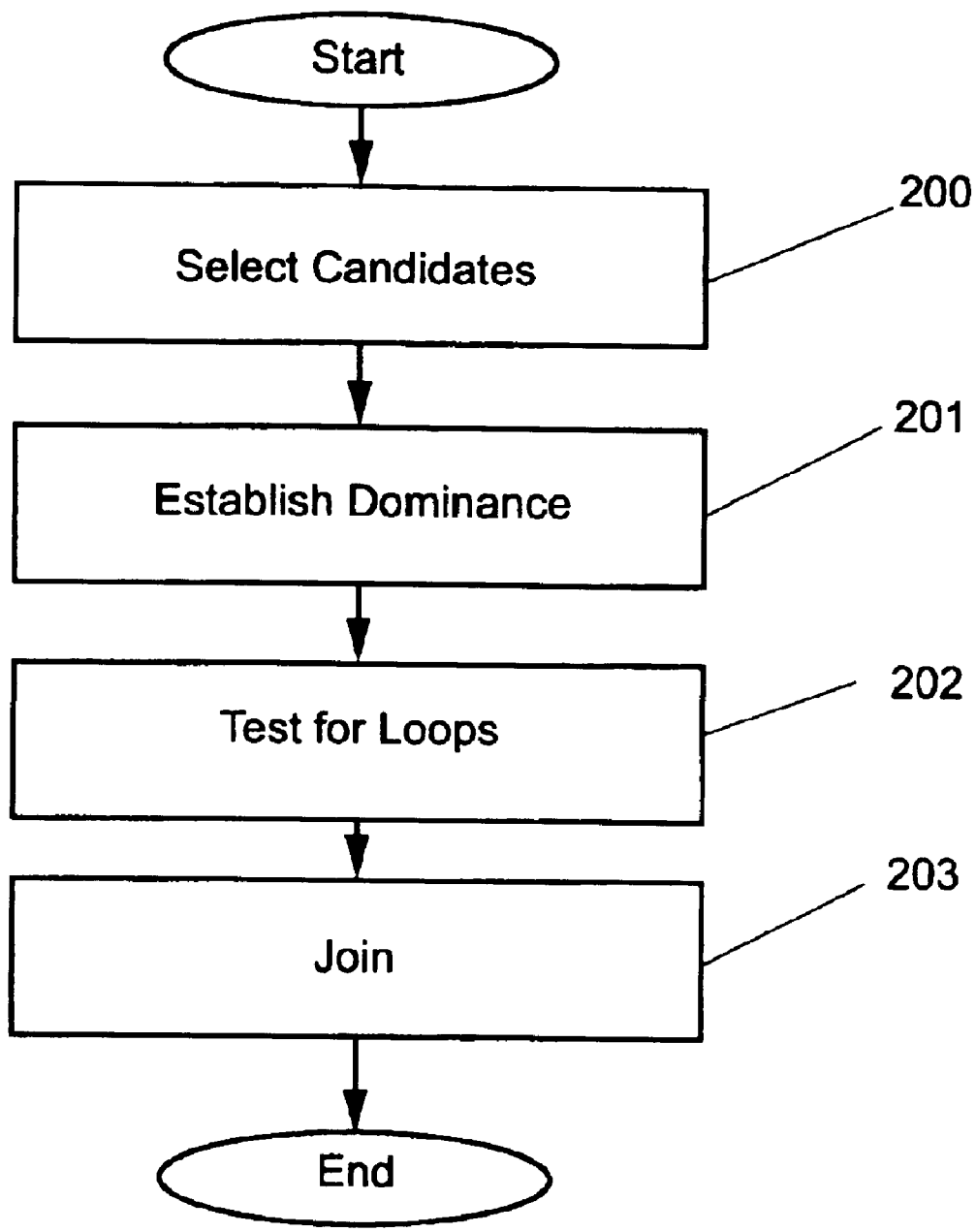
FIG. 2 is a block diagram of a "LoopFreeBuild".

Referring now to FIG. 2, a block diagram of an overview of the present invention is shown. FIG. 2 shows the four basic acts for building a loop-free bus which comprise a presently preferred embodiment of the present invention: Act 200, Select Candidate(s), determine which untested connection(s) should be processed; Act 201, Establish Dominance, assert temporary exclusive right to activate candidate connection(s); Act 202, Test for Loop, test whether candidate connection(s) would form a loop if enabled; and Act 203, Join, activate candidate connection(s) which tested "loop free".

The acts shown in FIG. 2 comprise the essential elements of what the inventors term a "LoopFreeBuild", that is, building a system free from loops. In practice, however, two fundamentally different approaches to LoopFreeBuild have been explored. The first situation is where only one new, or "candidate", connection has presented itself to the bus for joining. The second situation is where multiple candidates are presented to the bus for joining at the same time. Each will now be taken in turn.

Single Candidate LoopFreeBuild

Selection of Candidates

Figure 3:
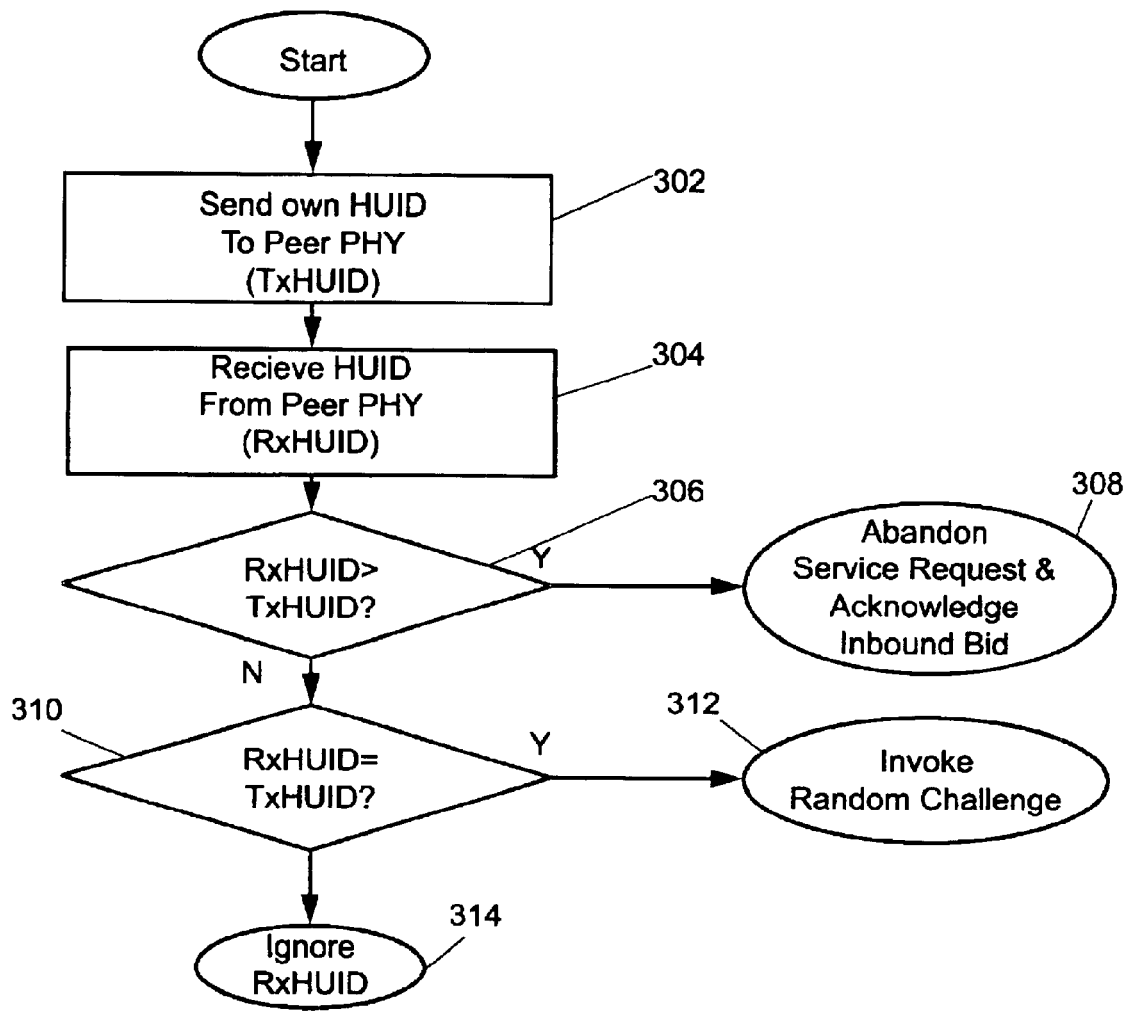
FIG. 3 is a block diagram of a Single Candidate Selection process.

FIG. 3 is a flow chart showing the Single Candidate Selection process. Starting at act 302, the candidate PHY transmits a HUID (hereinafter a TxHUID) to the peer PHY; and in act 304, the PHY receives a HUID (hereinafter a RxHUID) from the peer PHY. In decision act 304, the RxHUD is compared with the TxHUID. If the RxHUID is greater than the RxHUID, than the process proceeds to act 308, where the candidate PHY abandons its outbound ServiceRequest, and acknowledges the incoming bid, thereby ending its bid. If the RxHUID is not greater than the TxHUID, than the process moves to decision act 310.

In decision act 310, if the RxHUID is equal to the TxHUID, than the PHY will invoke a random challenge in act 312. If the RxHUID is not equal to the TxHUID, than by definition the TxHUID is greater than the RxHUID, and the process will move to the Establish Dominance and Test for Loops process.

FIGS. 4A–4F show an example how this is accomplished in a preferred embodiment of the present invention.

Figure 4A:
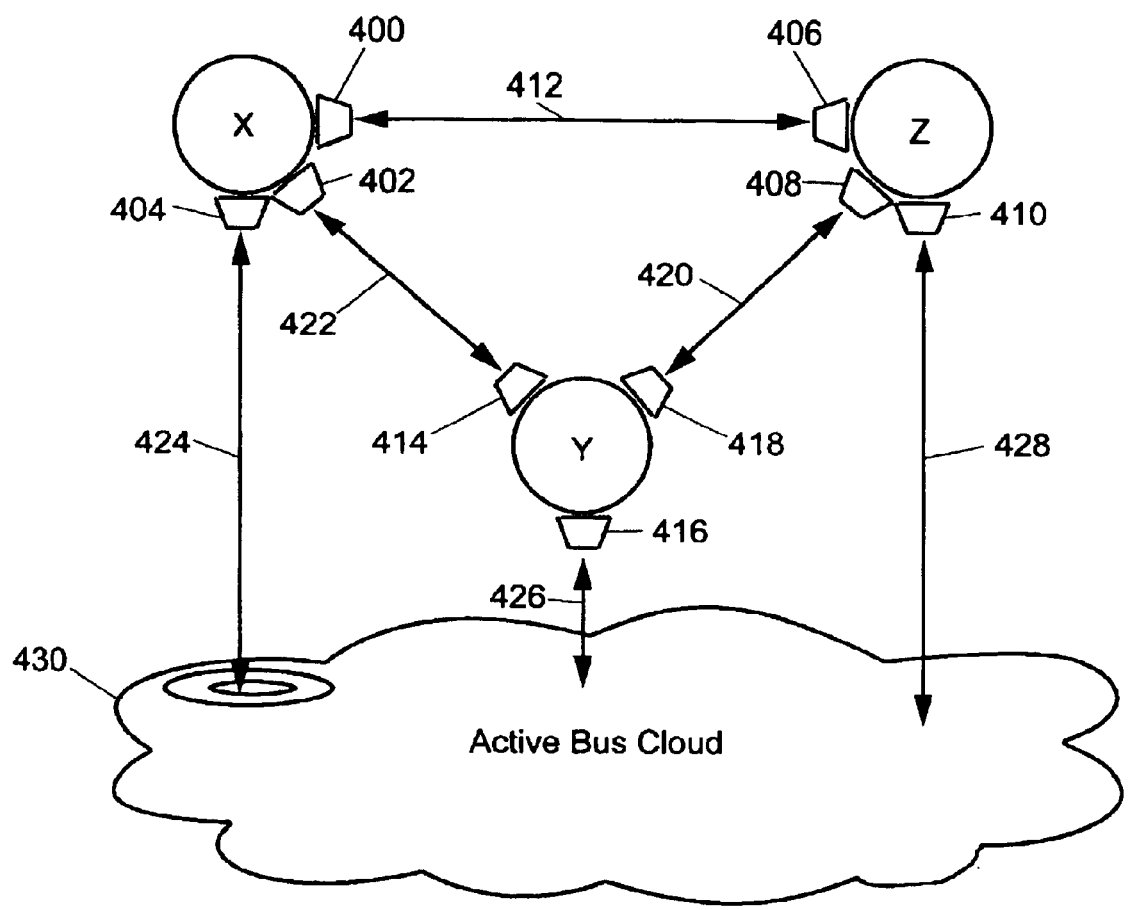
FIG. 4A is an example of a Single Candidate Selection process.

FIG. 4A shows three PHYs X, Y, and Z. PHY X is shown having three ports 400, 402, and 404. PHY Z is shown having three ports 406, 408, and 410. PHY Y is shown having three ports 414, 416, and 418.

PHY X, through port 400, has an untested connection 412 to PHY Z through port 406. PHY X, through port 402, has an untested connection 422 to PHY Y through port 414. Finally, PHY Y, through port 418, has an untested connection 420 to PHY Z through port 408. An untested connection is one that has achieved connectivity but has not yet been tested for loops. This state may occur for any number reasons; by way of example, PHYs X and Z may all be connected by a user at the same time or may be powered up simultaneously.

PHY X has a qualified connection 424 through port 404 to an existing bus, shown herein as bus cloud 430. Likewise, PHY Y has a qualified connection 426 through port 416 to bus cloud 430, and PHY Z has a qualified connection 428 through port 410 to bus cloud 430.

In a preferred embodiment of the present invention, in order for a candidate connection to be tested and joined, peer PHY ports at the opposing ends of the candidate connection must agree to service the connection at a given instant.

Figure 4B:
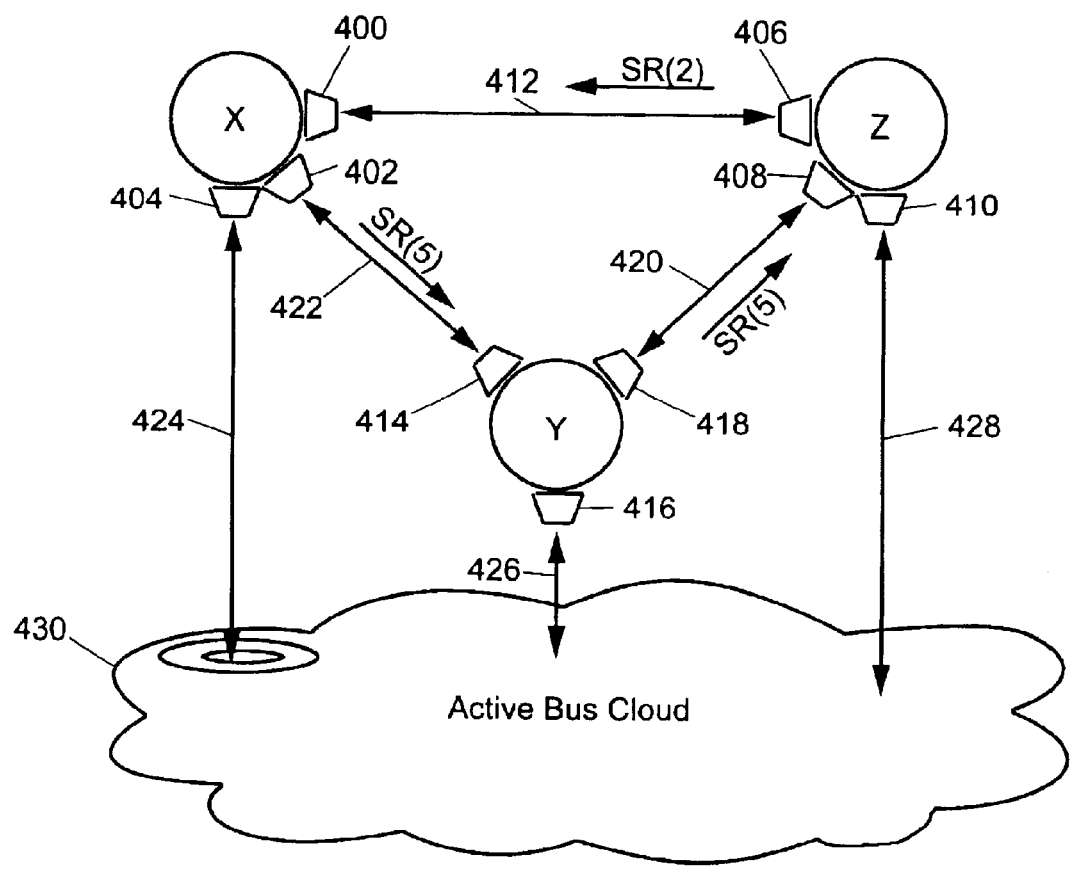
FIG. 4B is an example of a Single Candidate Selection process.

FIG. 4B shows PHYs X Y, and Z beginning to communicate with each other. To establish the necessary cooperation, a given PHY attempts to gain the attention of a neighboring PHY by sending a ServiceRequest symbol across a single chosen untested connection. In effect, the ServiceRequest says to a neighboring PHY "I would like to have your attention, please." As appreciated by those of ordinary skill in the art, challenges must be asserted long enough to ensure that all candidate PHYs have heard the challenge.

Within the ServicePacket, each PHY X, Y, and Z includes a Hopefully Unique Identifier number (HUID). A HUID is created by a random number generator within each PHY. In general, whoever has, the highest HUID will establish dominance. In FIG. 3B, PHY Z sends a ServiceRequest symbol containing a HUID of 2 to PHY X PHY Y sends a ServiceRequest symbol containing a HUID of 5 to PHY Z, and PHY X sends a ServiceRequest symbol containing a HUID of 5 to PHY Y.

For the purposes of this embodiment, when a PHY generates a HUID, it stores a copy internally. All PHYs listen on untested connections for an inbound ServiceRequest. When it receives a neighbor's HUID, the PHY then compares the received HUID with the HUID generated and stored internally. If the received HUID is greater than the PHYs own HUID, the PHY then cancels its bid to join the bus by abandoning its outbound ServiceRequest and acknowledging the inbound bid. If an equivalent HUID is received, a probalistically seeded back off or random challenge is invoked.

Figure 4C:
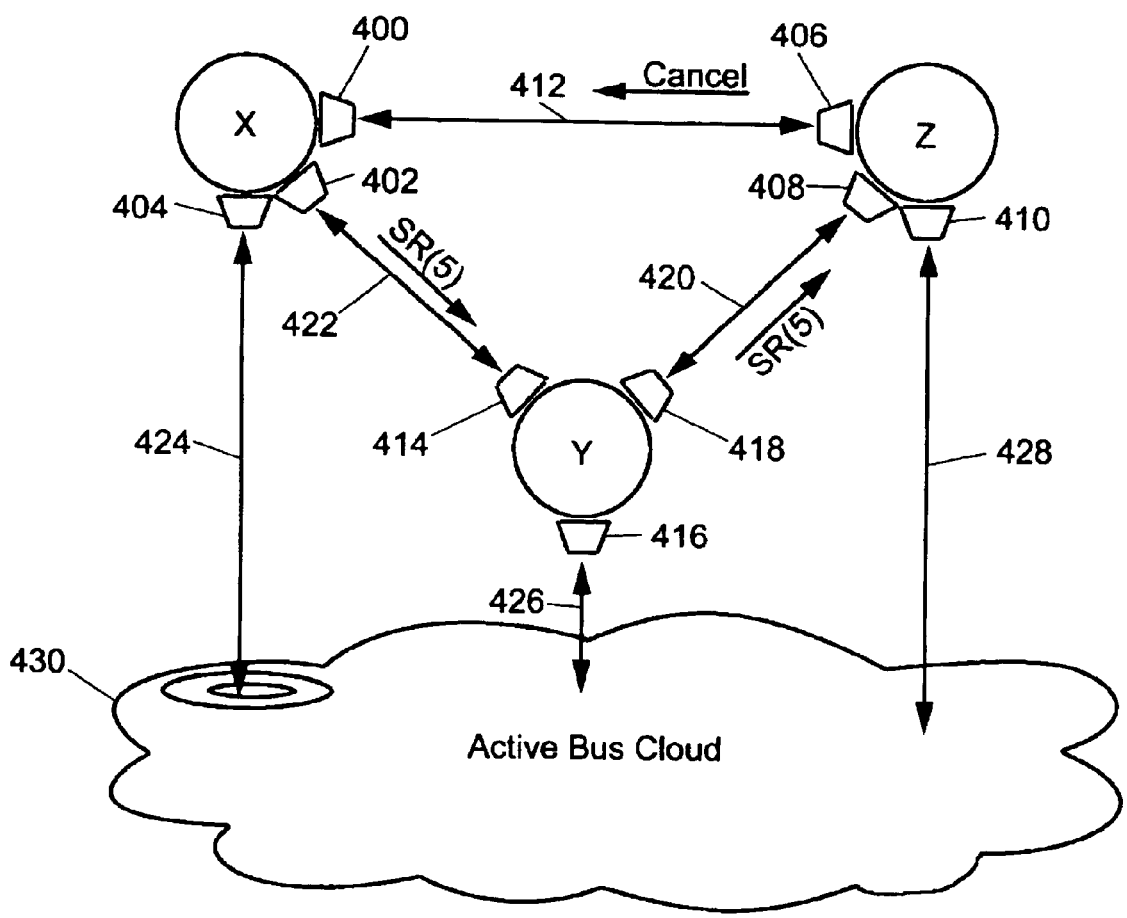
FIG. 4C is an example of a Single Candidate Selection process.
Figure 4D:
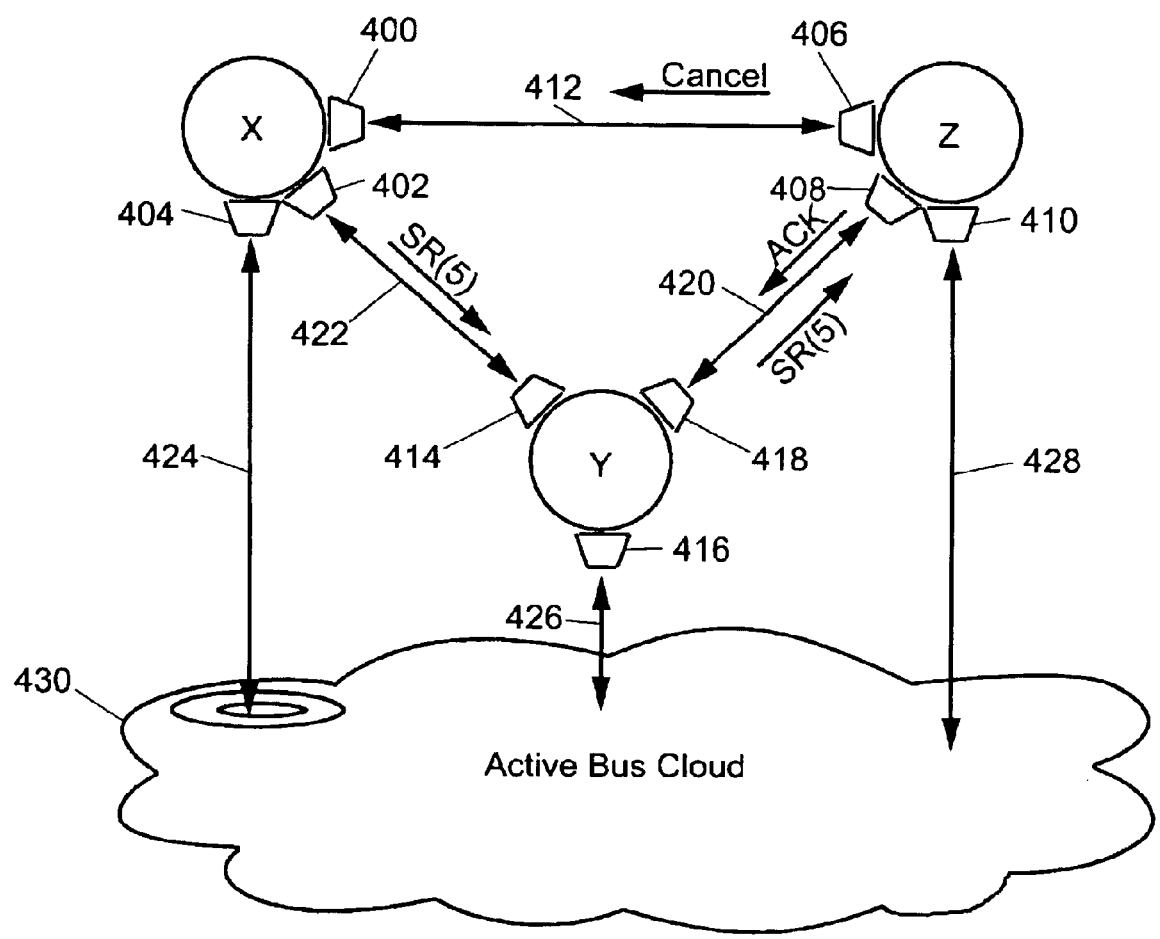
FIG. 4D is an example of a Single Candidate Selection process.

FIG. 4C shows this procedure in action. Since PHY Z sent an outbound HUID of 2, and it received an inbound HUM of 5, PHY Z is shown dropping its bid by canceling its outbound ServiceRequest to PHY X. FIG. 4D shows PHY Z acknowledging PHY Y's inbound ServiceRequest by sending an acknowledgement, or ACK. At the same time PHY X is continuing to send another challenge to PHY Y.

Figure 4E:
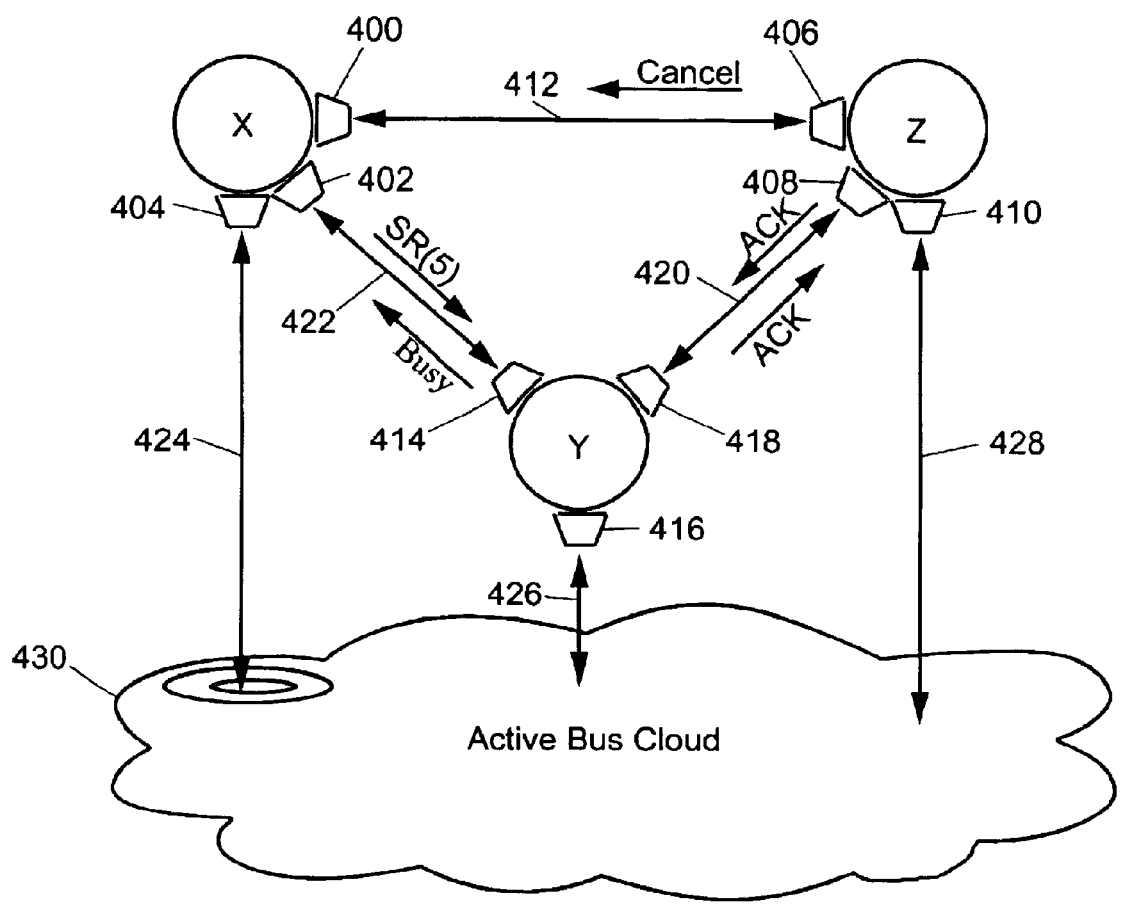
FIG. 4E is an example of a Single Candidate Selection process.

The process continues in FIG. 4E. The presence of an acknowledgement from PHY Z allows PHY Y to acknowledge PHY Z, and send a Busy signal to PHY X. A Busy signal indicates the recipient that the sender will not entertain any more challenges for the present cycle.

Figure 4F:
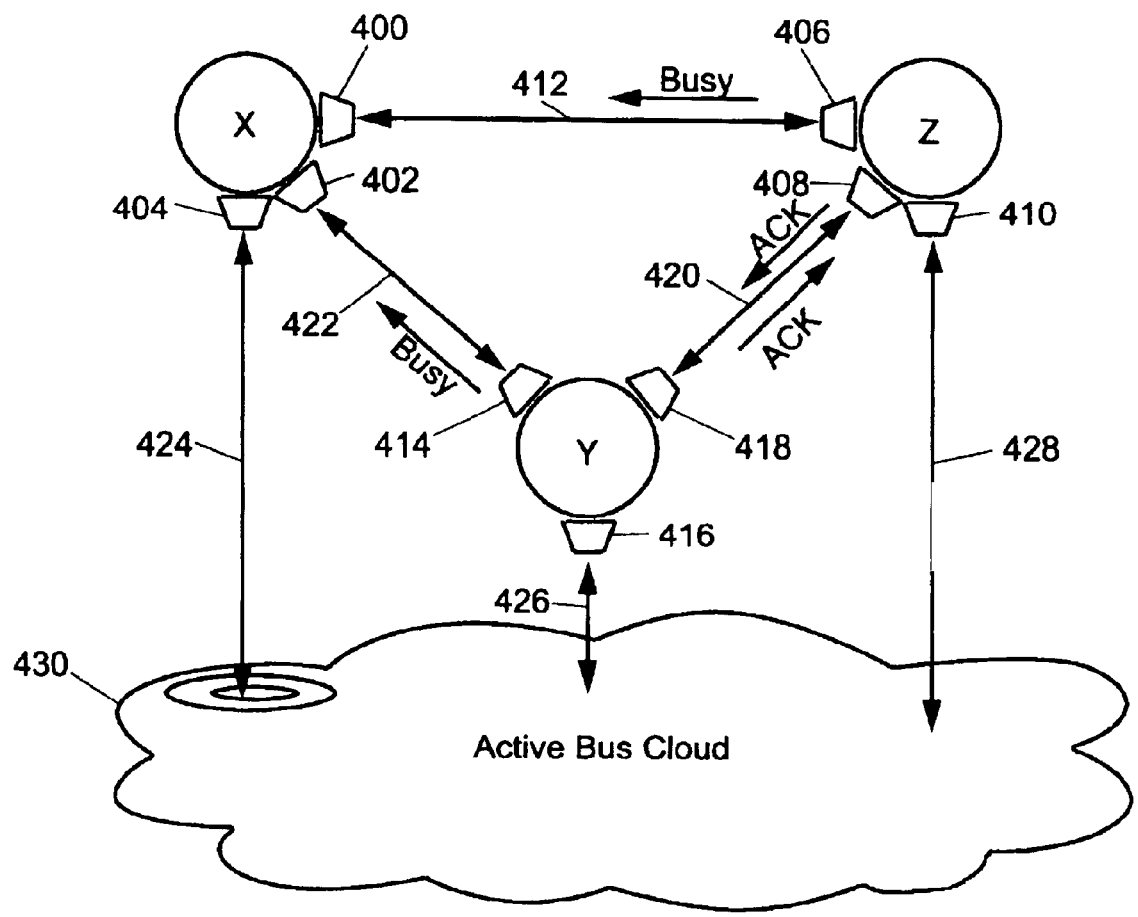
FIG. 4F is an example of a Single Candidate Selection process.

In FIG. 4F, PHY Z, upon seeing PHY Y's acknowledgement, busies PHY X as well. As a result, PHYs Y and Z have now selected each other to continue and test the link. As is appreciated by those of ordinary skill in the art, the result of this process is that a methodical and systematic method has been demonstrated which allows multiple candidates for connection to be narrowed down to two candidates.

Establish Dominance and Test for Loops

As is appreciated by those of ordinary skill in the art, it is essential that only one candidate pair be testing for loops at any one time. The Establish Dominance act ensures this occurs by forcing a PHY that to arbitrate for control of the bus before joining.

In practice, the next two acts of establishing dominance and testing for loops are performed simultaneously. FIGS. 4A–4F show these acts in action.

Figure 5A:
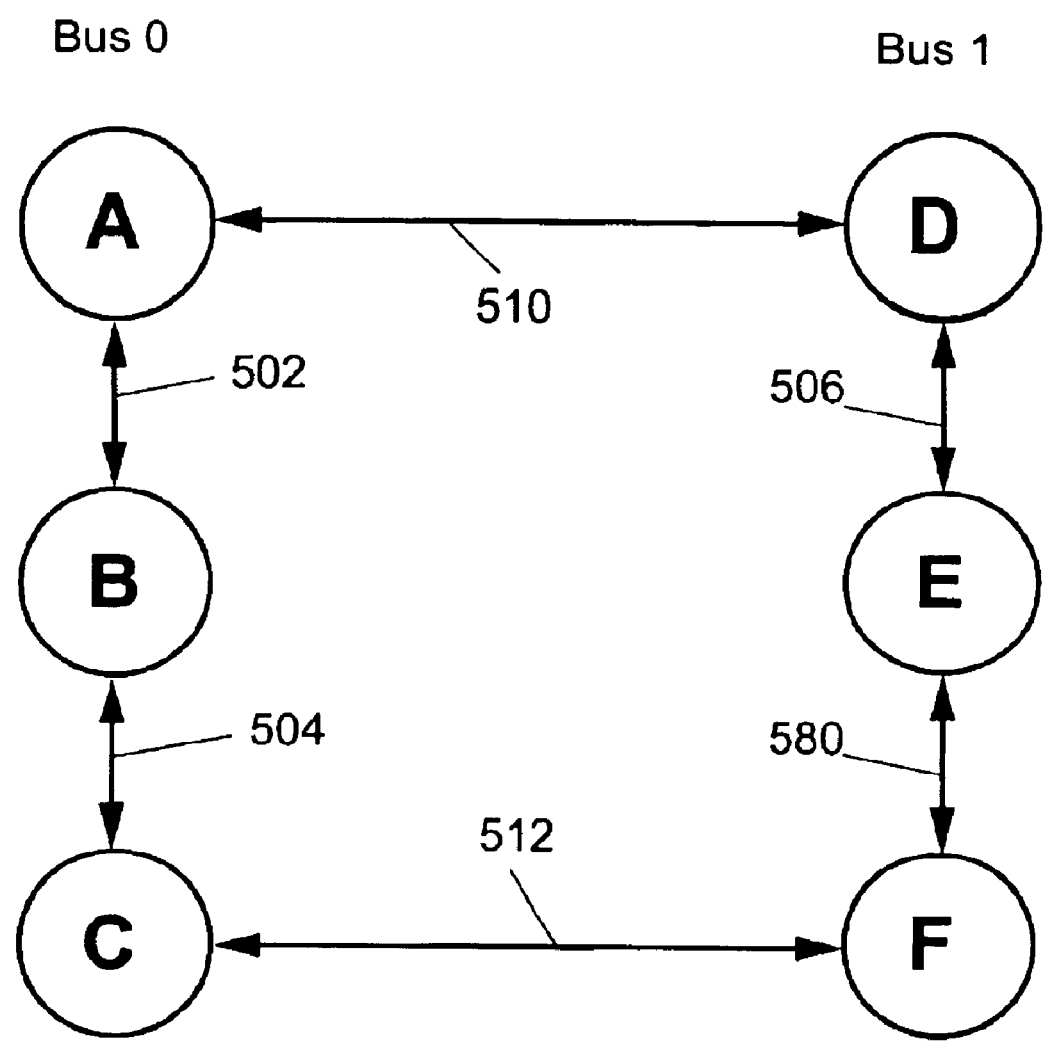
FIG. 5A is an example of an Establish Dominance process.

FIG. 5A shows two buses, Bus 0 and Bus 1. Bus 0 has PHYs A, B, and C connected with pre-existing links 502 and 504, respectively; and Bus 1 has PHYs D, E, and F connected with pre-existing links 506 and 508, respectively. In FIG. 5A, PHYs A and D would like to join through link 510, and PHYs C and F would like to join through link 512. In a presently preferred embodiment, this selection occurred as a result of the Single Candidate Selection process as just described. As is appreciated by those of ordinary skill in the art, if PHYs A and D were allowed to join simultaneously with PHYs C and F, a loop would form.

To prevent this, in a preferred embodiment of the present invention, ports on the candidate connection arbitrate for control of their respective buses. In practice, isolated PHYs wait a bit longer to begin arbitration to help reduce the need for long bus resets when joining.

Figure 5B:
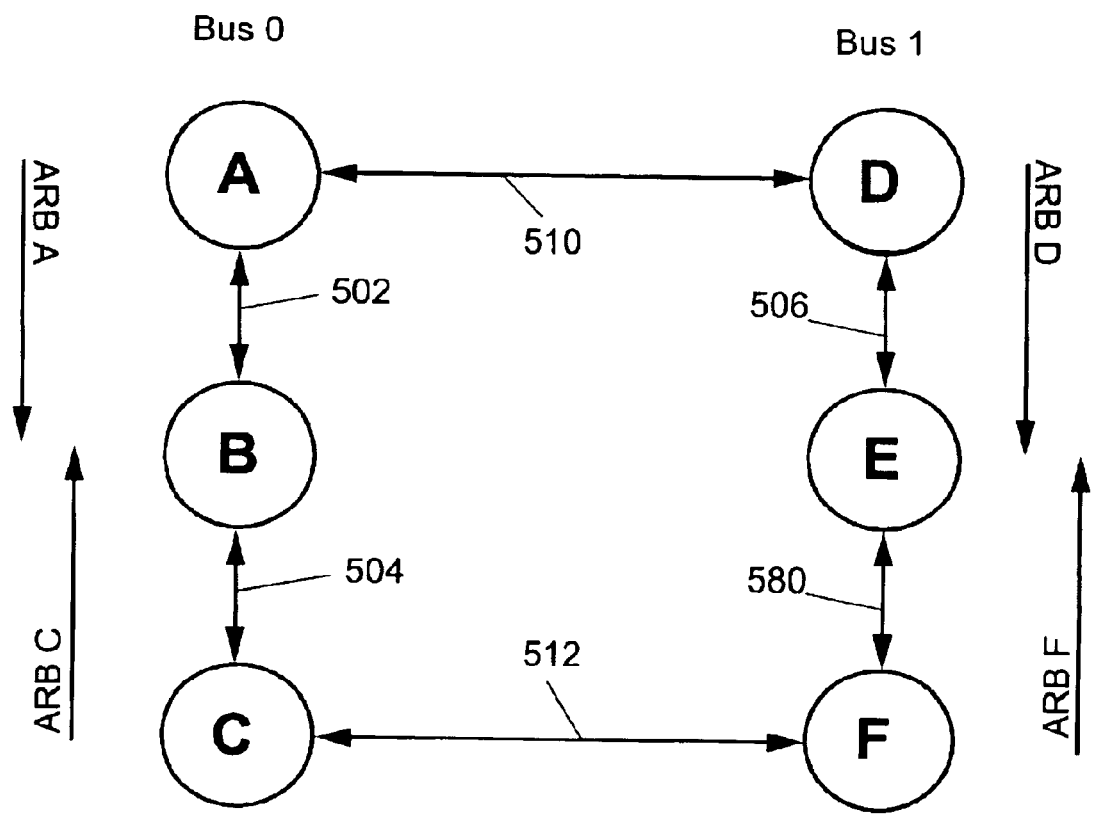
FIG. 5B is an example of an Establish Dominance process.

FIG. 5B shows all four PHYs arbitrating for their respective buses, that is, PHYs A and C are arbitrating for control of Bus 0, and PHYs D and F are arbitrating for control of Bus 1. In a preferred embodiment of the present invention, this arbitration takes place in accordance with the IEEE-P1394b standard.

Figure 5C:
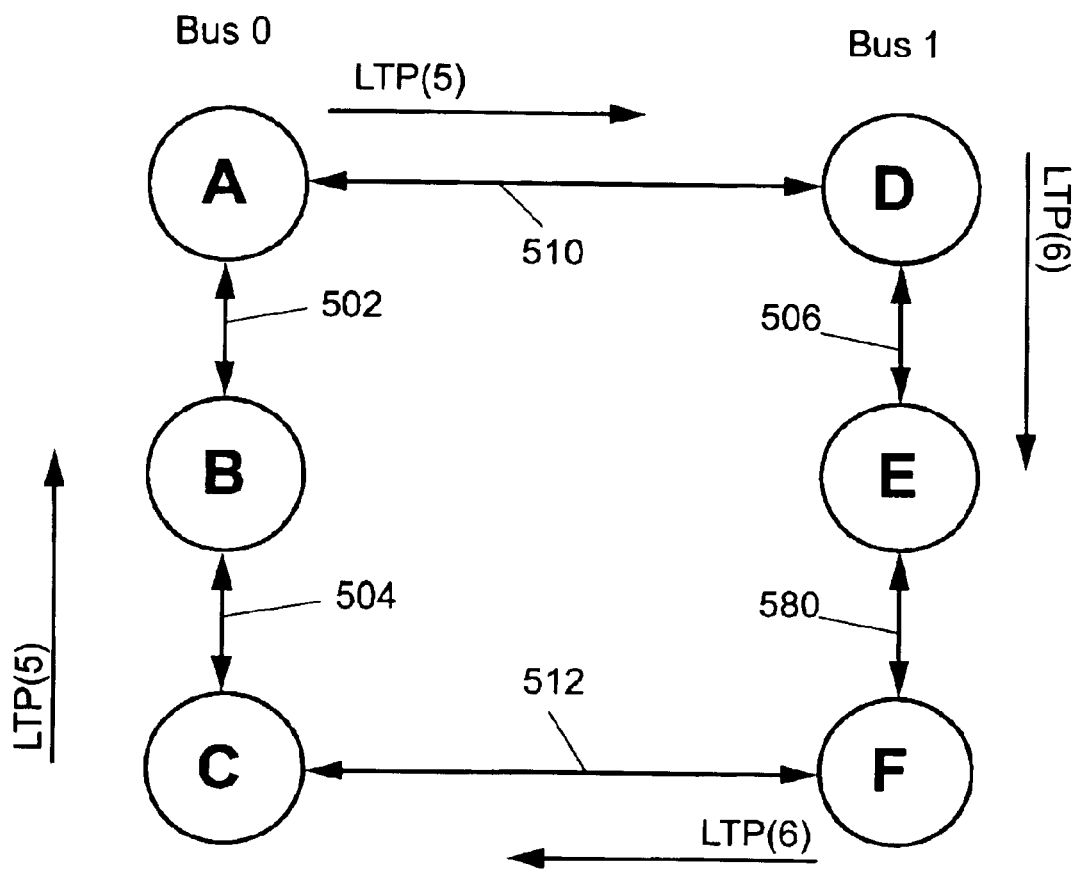
FIG. 5C is an example of an Establish Dominance process.

FIG. 5C shows that in this example, it will be assumed that PHYs D and C win arbitration. In accordance with a preferred embodiment of the present invention, PHYs C and D has established themselves as dominant, and can begin transmitting their Loop Test Packet (LTP) on the main bus.

FIG. 5C shows PHY A privately reporting any LTP it receives to PHY D, and PHY F privately reports any LTP it receives to PHY C. This private reporting ensures that the LTP sent by PHY C is heard by PHY D, and visa versa, thus allowing dominance to be established.

Figure 5D:
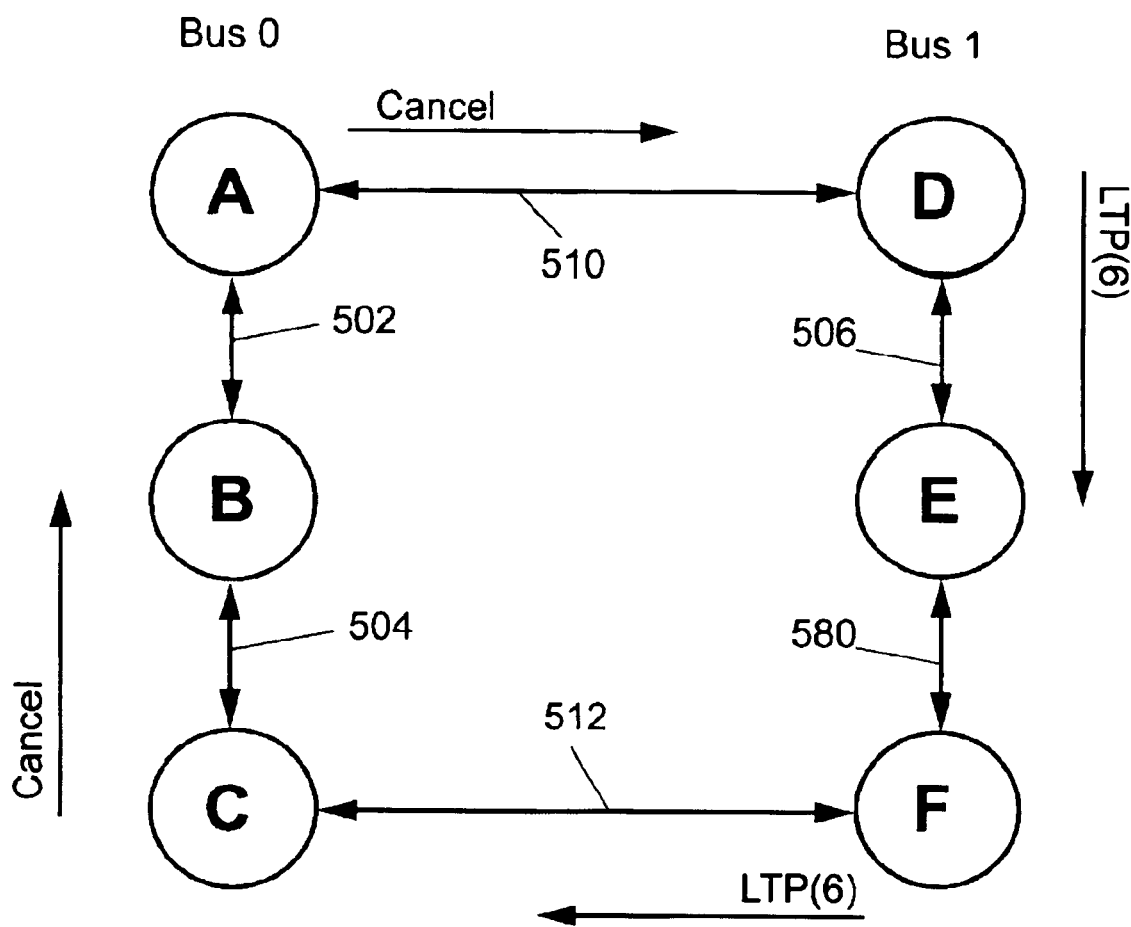
FIG. 5D is an example of an Establish Dominance process.

Next, FIG. 5D shows the HUID comparison process in action. The peer port is instructed to listen for any LTP and communicate any received HUTD back to the local port. If an LTP is received with a higher HUID, the local PHY drops transmission of the LTP and will retry after a bus reset or the peer PHY reports the absence of a received LTP. A lower received HuID, or no received LTP, establishes the local PHY as dominant. An equivalent received HUID causes a pseudo-random back-off sequence.

A loop is detected if a port must try a specified number of tries unsuccessfully. If a port reaches a predetermined number of tries, a loop is presumed to exist and the PHY moves on to the next untested port. In a presently preferred embodiment of the present invention, a preset limit of four or five tries has proved satisfactorily.

As a result of the above process, FIG. 5D shows PHY C withdrawing its LTP given the lower HUID.

As can be appreciated by those of ordinary skill in the art, many different schemes can be employed within a HUID. By way of example, one could encode the HUID with a code which weighted the numerical value with factors such as port speed or location. This would allow the faster ports to join sooner. Also, if one desired a certain device to always join, one could program a Guaranteed Unique Identifier, or a GUID. In one preferred embodiment, the GUID may be formed by allocating the most significant bits to the GUID, or zeros if one not available, and the least significant bits to a random number.

Figure 5E:
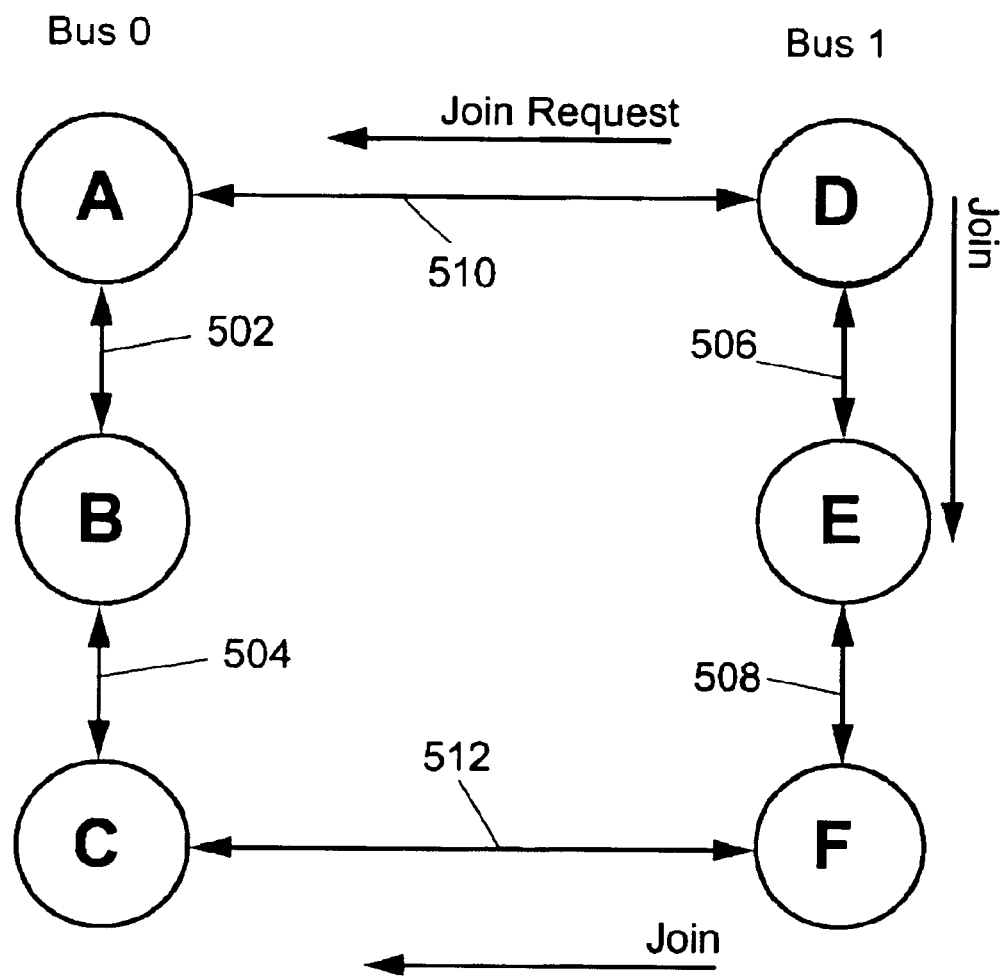
FIG. 5E is an example of an Establish Dominance process.

FIG. 5E shows PHY D recognizing that it has established dominance and not found a loop. Therefore, PHY D begins the join process with PHY A by sending a Joining Request privately on Bus 1.

Meanwhile, PHY broadcasts its join intent on Bus 1. In a presently preferred embodiment, the Join Message is encoded to be higher than any HUID. This ensures that PHYs which may join late will lose to a Join Request in a HUID contest. In a preferred embodiment, it is specified that an LTP is sent for a minimum amount of time equal to a subaction gap before dominance can be determined to allow for late-corners.

Additional Methods for Establishing Dominance

As was explained above, one of the main goals of the Establish Dominance act was to have one of the pair of candidate nodes establish control of its local bus. However, there may be situations were it is more desirable for one rather than the other candidate to establish control of its bus. For example, if one candidate node already has a pre-existing connection, and the other candidate node has no connections, then it is preferred that the connected node establish dominance rather than the unconnected, or remote node, thereby avoiding long bus resets.

It is contemplated that there are many ways to embody this preference. For example, in one preferred embodiment, the indicator that indicates whether the source node has a pre-existing connection may be included along with the HUID. In another preferred embodiment, the node itself may be programmed to determine its own connection status and behave accordingly when communicating with other nodes so programmed. In another preferred embodiment, the node determines whether it has pre-existing connections. If it does, the node will immediately move to establish dominance. It the node has no connections, then the node will wait a pre-determined amount of time before moving to establish dominance.

Join

The final act in the LoopFreeBuild process is the join. Once a connection has been tested and found loop-free through the above acts, it can be joined.

Figure 6:
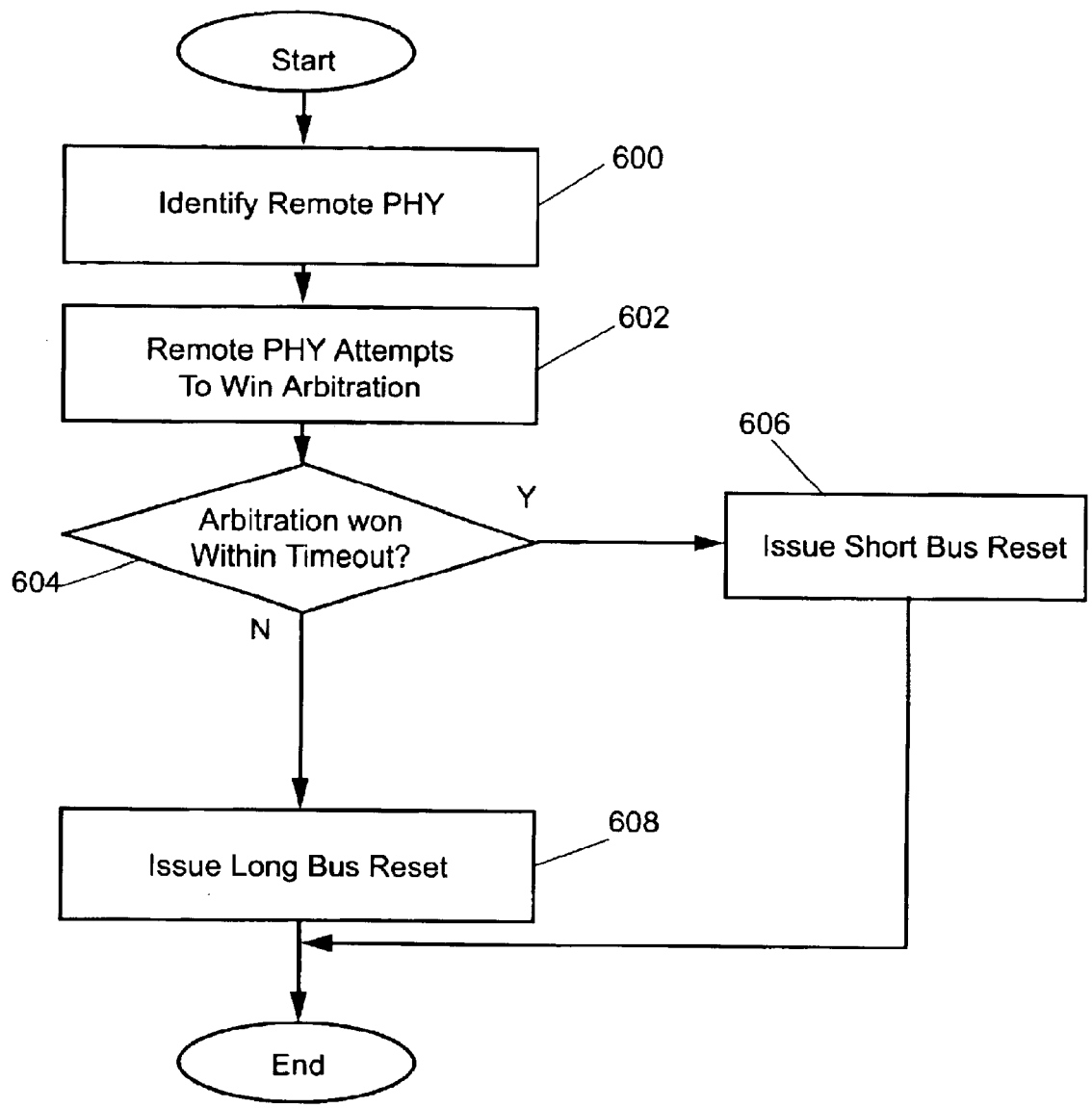
FIG. 6 is a flow chart of a Join Procedure.

The join process comprises four acts as shown in the flowchart in FIG. 6. In a presently preferred embodiment, the following acts are taken to reduce the risk of bus resets.

In act 600, remote PHYs are identified and are asked to join. In act 602, the remote PHY identified in act 600 attempts to win arbitration.

As is known by those of ordinary skill in the art, the timing of the arbitration act is critical. In a preferred embodiment of the present invention, if arbitration sought in acts 600 and 602 is won within the time period of a maximum-sized asynchronous packet, query 604 will result in a short bus reset being issued to both buses in act 606. As is known by those of ordinary skill in the art, a short bus reset is advantageous because there is minimum impact to the operation of devices connected to the bus.

If arbitration is not won within the specified timeout, the decision of act 63 will result in a long bus reset is issued in act 608.

Single Candidate Advantages

As can be appreciated by those of ordinary skill in the art, the single candidate process has certain advantages. For example, there will be a lower occurrence of long bus resets since only a maximum of two arbitration domains have to line up at a time. The single candidate process is easier to weight towards high speed connections coming up first through the use of weighted HUIDs or GUIDs. Furthermore, in a single candidate process, it may be simpler to validate and ensure that loops will not be formed. In other words, the LoopFreeBuild process is more reliable in the single candidate scenario. Finally, in a single candidate process, remote PHYs only need to be listened to on one untested port at a time.

Multiple Candidate

The discussion will now turn to the LoopFreeBuild multiple candidate case, where at any instant in time, any number of candidate connections to a given bus are selected for testing and joining.

Selection of Candidates

The selection of candidates is simplified in the multiple candidate case. Here, each local PHY selects all untested ports as candidates; there is no selection procedure as in the single candidate case.

Establish Dominance and Test for Loops

As with the single candidate LoopFreeBuild process, the acts of establishing dominance and testing for loops are combined. FIGS. 7A–7E show the multiple candidate process.

Figure 7A:
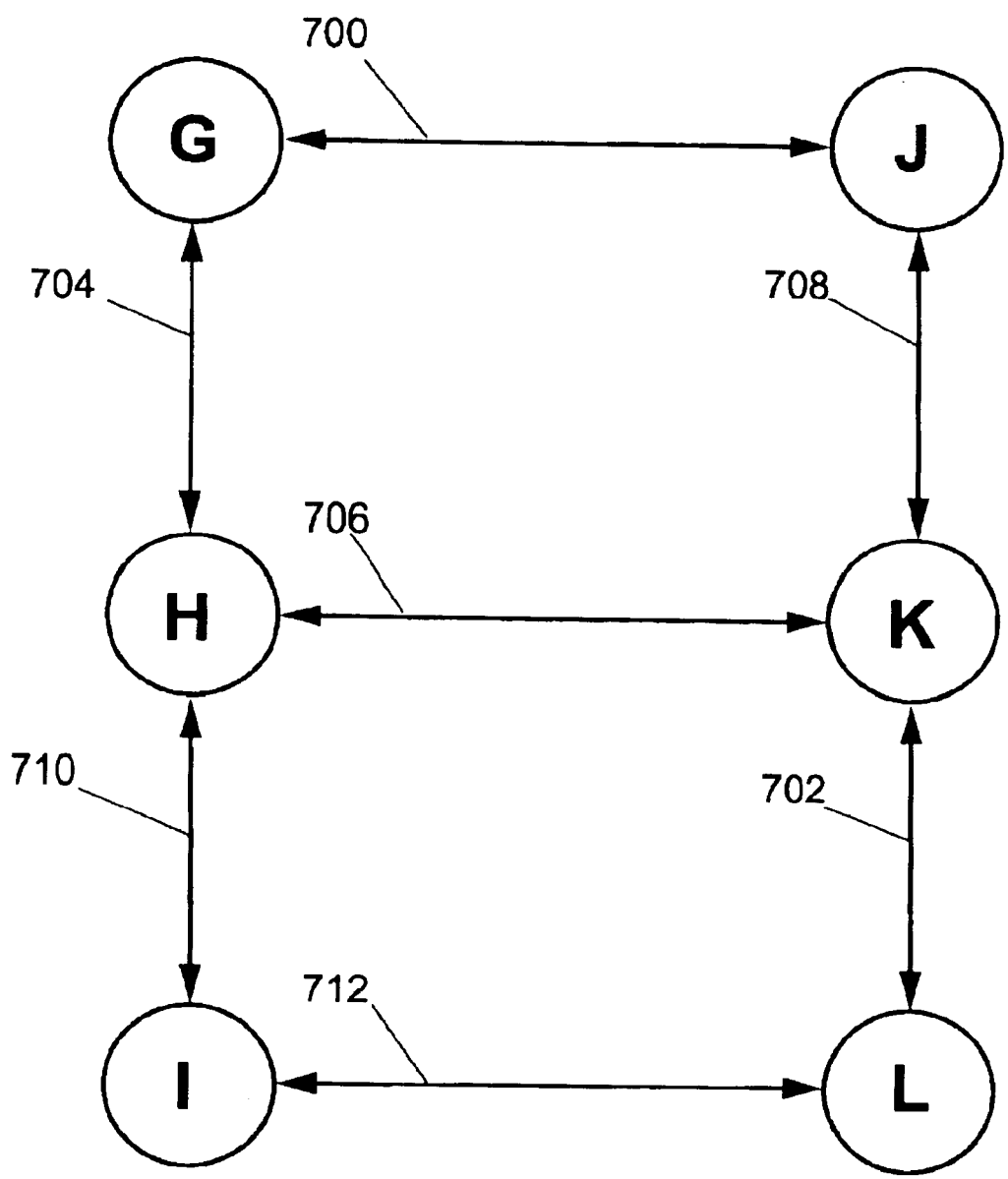
FIG. 7A is an example of a Multiple Candidate Selection process.

Referring now to FIG. 7A, PHYs G, H, I, J, K, and L are presented for joining. In FIG. 7A, PHYs G and J have a qualified connection 700, and PHYs K and L have a qualified connection 702.

In FIG. 7A, PHYs G and H have an untested connection 704, PHYs H and K have an untested connection 706, PHYs J and K have an untested connection 708, PHYs H and I have an untested connection 710, and PHYs I and L have an untested connection 712.

In a multiple candidate case, each PHY with untested ports arbitrates for its active bus. In practice, isolated PHYs wait a bit longer to begin arbitration to help reduce the need for long bus resets when joining.

Figure 7B:
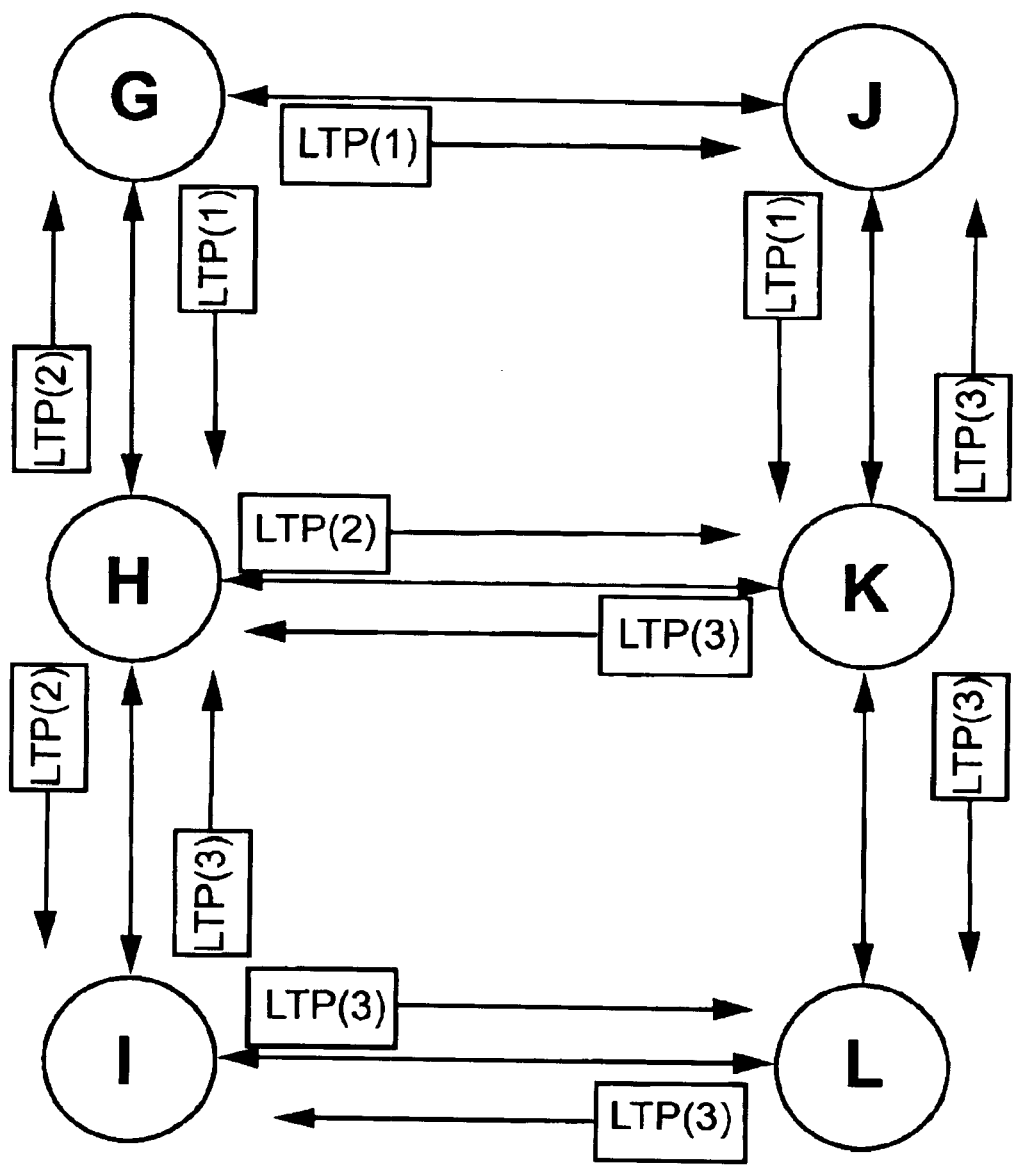
FIG. 7B is an example of a Multiple Candidate Selection process.

Referring now to FIG. 7B, after winning arbitration, a Loop Test Packet (LTP) containing a HUID is transmitted on the bus, and a Loop Test Symbol (LTS) is sent through any untested ports. At all times, untested ports transmit the last HUID seen in a LTP to their respective peer ports as an LTS. Likewise, they receive HUIDs from their peers within an LTS. In FIG. 7B, PHY G transmits a LTP with a HUID of 1, PHY H transmits a HUID with a value of 2, PHY I transmits a LTP with a HUID of 3, and PHY K transmits a LTP with a HUID of 3.

After transmitting a LTP for the minimum duration, the PHY examines the received HUIDs contained within a given received LTS. If any received HUID is greater than the transmitted HUID, the PHY shall not join any connections. That is, any PHY which receives a higher HUID than it is transmitting refrains from any join attempts until the next time around.

Figure 7C:
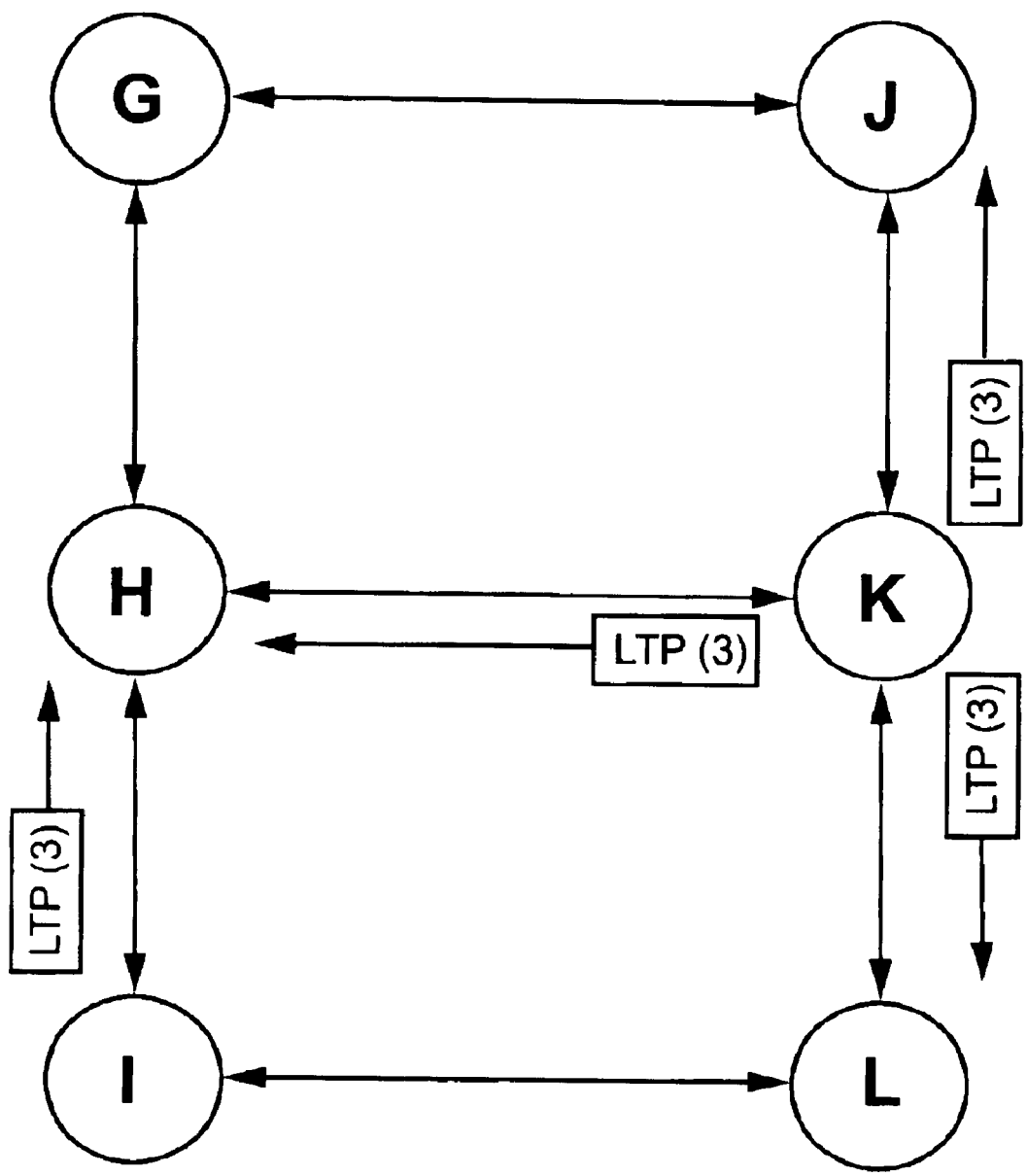
FIG. 7C is an example of a Multiple Candidate Selection process.

Referring now to FIG. 7C, if the maximum received HUID is less than the transmitted HUID, the PHY is free to simultaneously join those connections which are reporting a HUID less than the transmitted HUID. If the received HUID is greater than the transmitted HUID, the PHY must withdraw its bid. Here, PHYs G and H drop out due to their lower HUIDs.

Referring now to FIG. 7C, any untested port receiving a HUID equal to the one being transmitted must refrain from any join attempt until the next time around. Here PHY L drops out due to its equal HUID.

As can be appreciated by those of ordinary skill in the art, the use of random HUIDs will allow all but looped connections to eventually activate.

Join

Figure 7D:
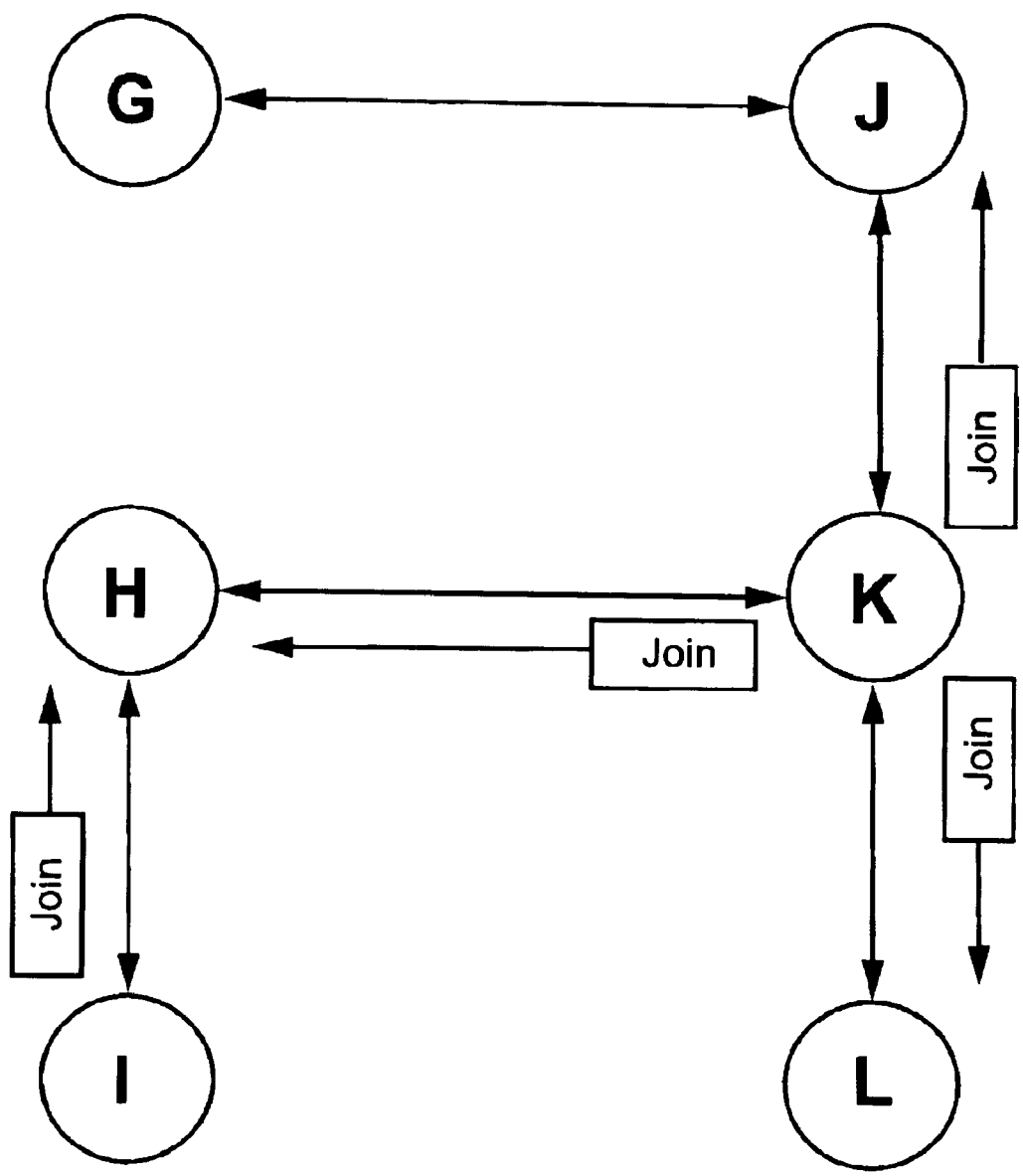
FIG. 7D is an example of a Multiple Candidate Selection process.

Referring now to FIG. 7D, the remaining nodes now send a Join Request to the other surviving candidates.

Figure 7E:
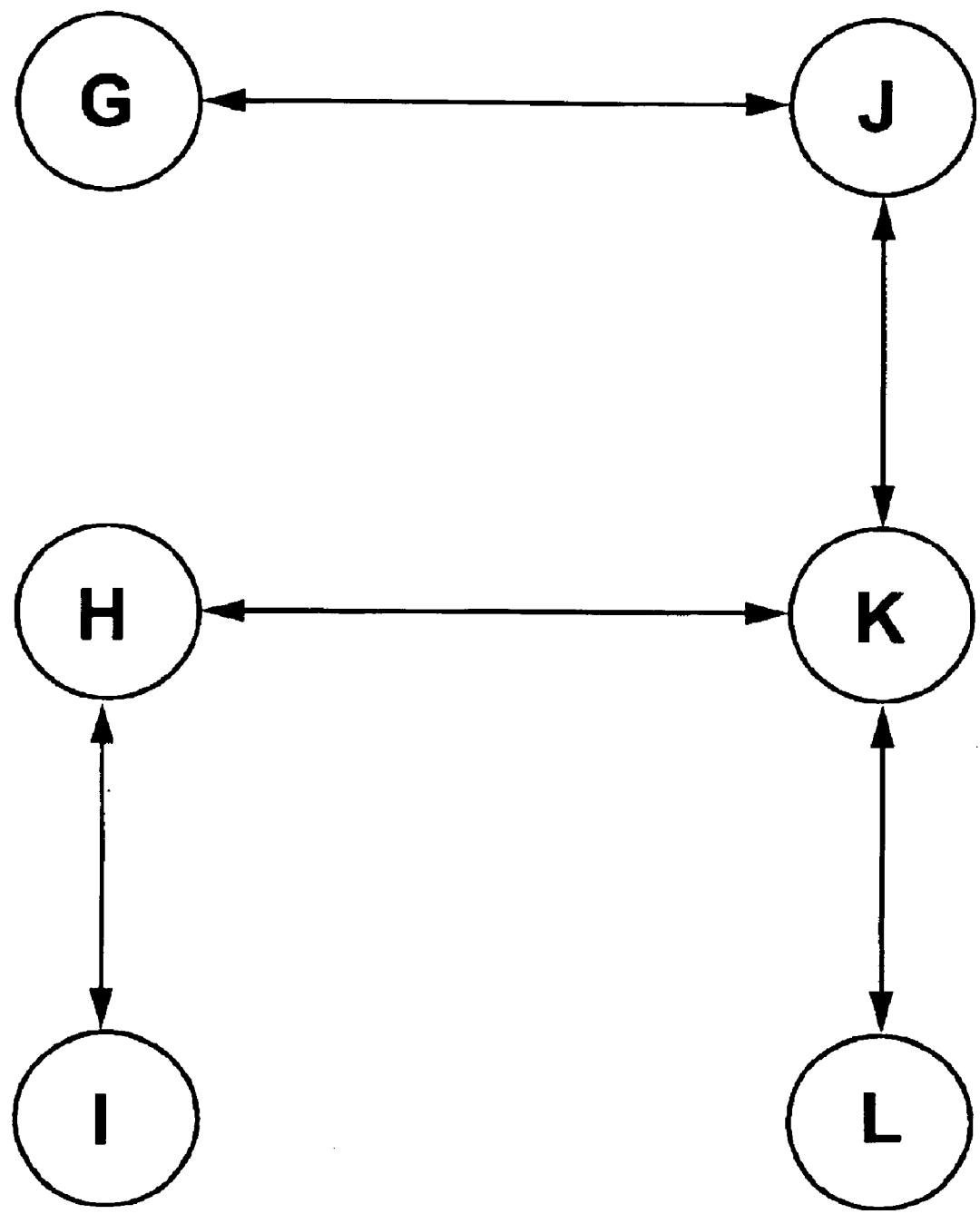
FIG. 7E is an example of a Multiple Candidate Selection process.

Referring finally to FIG. 7E, a bus reset is performed, and joins are performed on the remaining untested ports.

As those of ordinary skill in the art will appreciate, the system has been built with no loops and only one bus reset.

Multiple Candidate Advantages

As will be appreciated by those of ordinary skill in the art, the multiple candidate process has certain advantages. For example, there is no need for the selection of candidates process that is required in the single candidate scenario. Also, since only one bus reset is required to join multiple candidates, the multiple candidate scenario is likely to result in fewer total bus resets when coming up from ground state. Furthermore, the multiple candidate scenario is easier to weight towards servicing more untested ports per cycle. Finally, there is no special case required for the loop-back-to-self situation, where a user inadvertently connects a device to itself.

Disconnect Detection

As is appreciated by those of ordinary skill in the art, after a user removes the connection that is causing the loop, two separate buses now exist that may be connected. In a preferred embodiment of the present invention, a procedure for detecting such an event is provided. Periodically at a predetermined rate, or after a bus reset, the system will attempt to connect the quarantined branches.

State Diagrams

Figure 8:
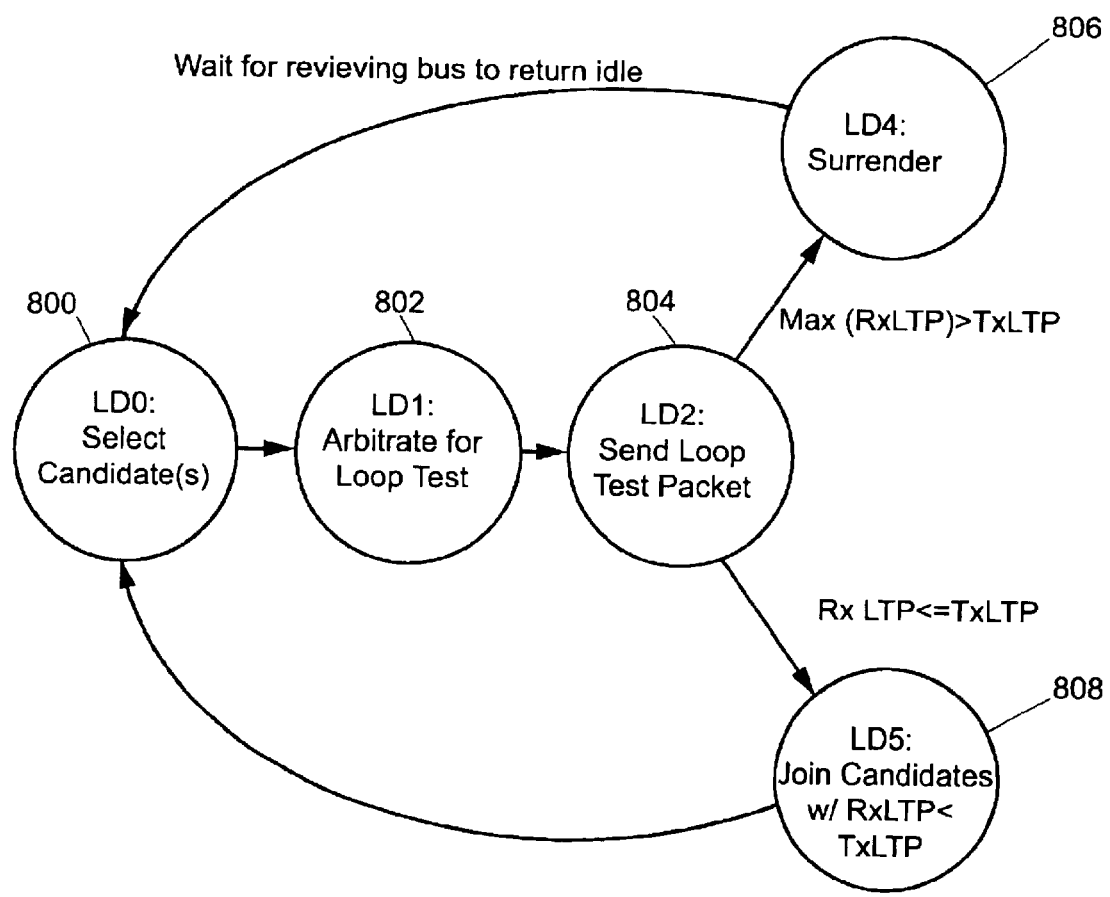
FIG. 8 is state machine diagram of a possible LoopFreeBuild process.

FIG. 8 shows sequence according to the present invention described in a machine state diagram. In a preferred embodiment of the present invention, state 800 begins the process of selecting one or more candidates. The selected candidates then arbitrate for control and to send a loop test packet in state 802. After winning arbitration, the candidates then send their loop test packets in state 804, and listen for received loop test packets, and compare their transmitted loop test packets (TxLTP) with those received (RxLTP).

If any RxLTP is greater than the TxLT, the sequence moves to state 806, and the candidate surrenders, and will wait for the receiving bus to return to idle before trying again in state 800. For those candidates whose TxLTP is greater than or equal to the maximum RxLTP, they may join the bus in state 808. The sequence will then return to the selection of candidates state in state 800.

Figure 9:
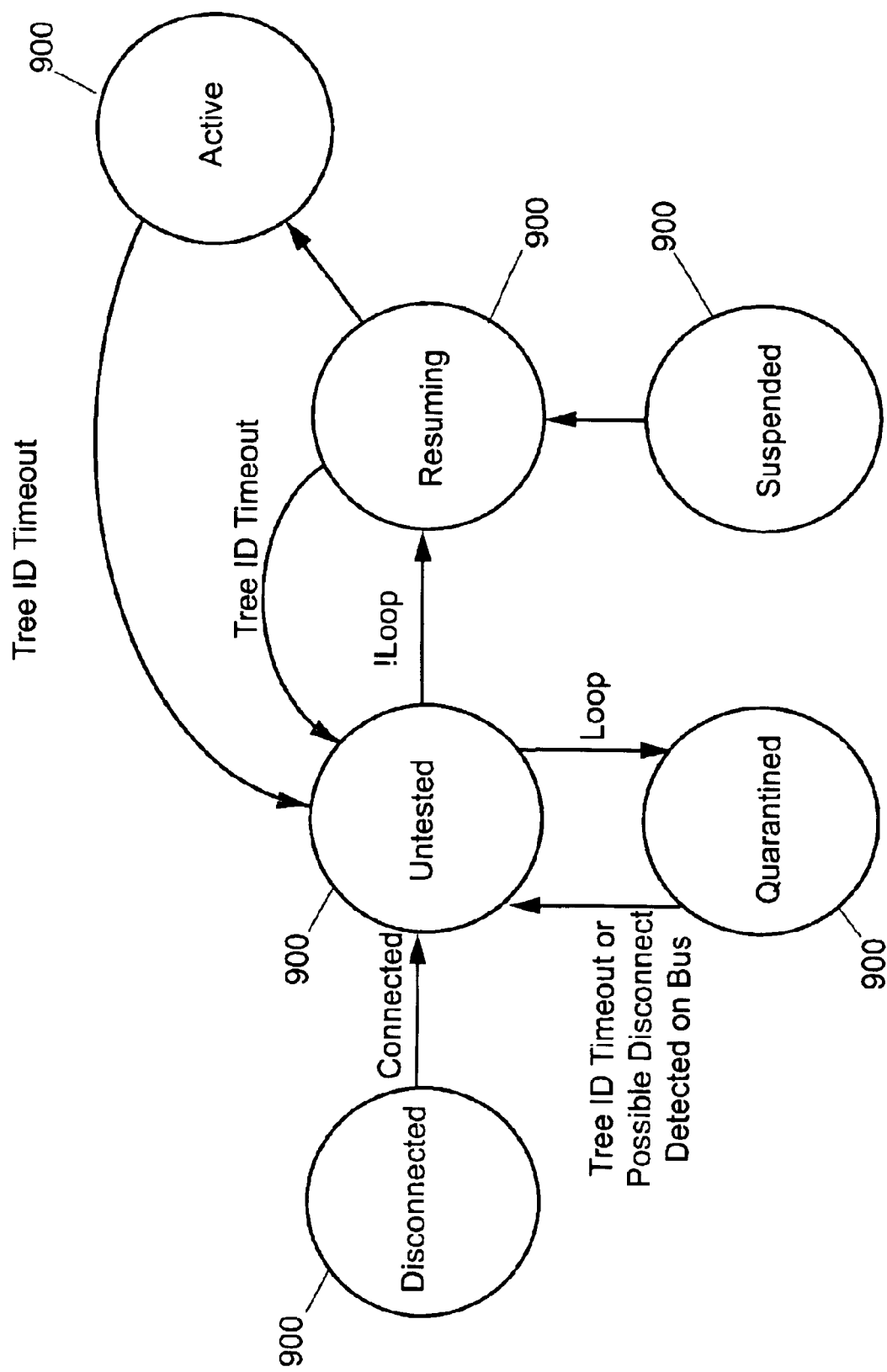
FIG. 9 is state machine diagram of a possible LoopFreeBuild process.

FIG. 9 shows a state machine diagram according to a preferred embodiment of the present invention that includes a contingency for when a device returns from a suspend state. The sequence starts in state 900 with a device in a disconnected state. When the device is connected in state 902, the system is tested for loops. If a loop is found, the device is quarantined in state 904. If no loop is found, then the device may be returned to a resuming state in state 906. If for some reason the device has a Tree-ID timeout while resuming, it will be returned to state 902. When the device becomes active on the bus, it will be in the active state as shown in state 908. Once active, if the device has a Tree-ID timeout it will be returned the untested state in state 902.

However, once a device connection has been tested for loops, it is possible for the user to place the device in a suspend mode. In accordance with a preferred embodiment of the present invention, when a device is in suspended state 910, and is resumed, it will be returned to the resuming state 906.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A network of a plurality of nodes, each node in communication with other nodes in the network via a full-duplex communications bus, at least one node comprising computer instructions which, when executed by on a computer, perform loop breaking, by:

the plurality of nodes selecting the untested connection to join the bus;

establishing dominance of the full-duplex bus by those nodes that selected said untested connection;

testing for loops through said untested connection by said dominant nodes; and joining said untested connection to said full-duplex bus by said dominant nodes if no loops are found in said bus.

2. The network of claim 1, wherein the act of selecting further comprises:

transmitting a request containing a unique identifier;

receiving requests transmitted by other candidates;

ignoring said received requests that meet a first condition;

abandoning the transmittal of further requests if said received requests meet a second condition and acknowledging the existence of said received requests; and challenging the request if said received request meets a third condition.

3. The network of claim 2, wherein said first condition is met if said unique identifier contained within said transmitted request is greater than said unique identifier contained within said received request.

4. The network of claim 2, wherein said first condition is met if said unique identifier contained within said transmitted request is less than said unique identifier contained within said received request.

5. The network of claim 2, wherein said first condition is met if said unique identifier contained within said transmitted request is equal to said unique identifier contained within said received request.

6. The network of claim 1, wherein said act of establishing dominance of said bus further comprises:

selecting a candidate by arbitrating for control of said bus;

transmitting a packet containing a unique identifier on said bus;

listening for packets received on said bus;

establishing dominance if the received packet meets a first condition;

dropping transmission of packets if said received packets meet a second condition; and re-transmitting packets a predetermined number of times if the received packets meet a third condition.

7. The network of claim 6, wherein said first condition is met if said unique identifier contained within said transmitted packet is greater than said unique identifier contained within said received packet.

8. The network of claim 6, wherein said first condition is met if said unique identifier contained within said transmitted packet is less than said unique identifier contained within said received packet.

9. The network of claim 6, wherein said first condition is met if said unique identifier contained within said transmitted packet is equal to said unique identifier contained within said received packet.

10. The network of claim 6, wherein said predetermined number of tries is less than or equal to ten.

11. The network of claim 6, further comprising the act of transmitting a join request on said bus when said first condition has been met.

12. The network of claim 1, wherein said act of joining a candidate further for control of said bus;

arbitrating for control of said bus;

waiting for a predetermined period of time;

issuing a short bus reset if said arbitration is won within said predetermined period of time; and issuing a long bus reset if arbitration is not won within said predetermined period of time.

13. The network of claim 12, wherein said predetermined period of time is less than or equal to the time period of one asynchronous packet on said bus.

* * * * *